United States Patent [19]

Juri et al.

[11] Patent Number: 5,329,375
[45] Date of Patent: Jul. 12, 1994

[54] INFORMATION RECORDING/REPRODUCING APPARATUS

[75] Inventors: Tatsuro Juri, Osaka; Masaru Nakahama, Neyagawa, both of Japan

[73] Assignee: Matsushita Electric Industrial Co., Ltd., Osaka, Japan

[21] Appl. No.: 840,755

[22] Filed: Feb. 24, 1992

[30] Foreign Application Priority Data

Feb. 26, 1991 [JP] Japan .................................. 3-030563

[51] Int. Cl.⁵ ........................................... H04N 7/133
[52] U.S. Cl. ................................... 358/343; 348/408; 348/472
[58] Field of Search .................. 358/133, 135, 136, 13, 358/141, 343; H04N 7/133

[56] References Cited

U.S. PATENT DOCUMENTS

| 4,656,500 | 4/1987 | Mori | 358/135 |
|---|---|---|---|
| 4,907,101 | 3/1990 | Keesen et al. | 360/48 |
| 4,982,282 | 1/1991 | Saito | 358/133 |
| 4,984,076 | 1/1991 | Watanabe et al. | 358/133 |
| 5,047,852 | 9/1991 | Hanyu et al. | 358/133 |
| 5,073,821 | 12/1991 | Juri | 358/133 |

FOREIGN PATENT DOCUMENTS 0339589 2/1989 European Pat. Off. .
0401854 12/1990 European Pat. Off. .

OTHER PUBLICATIONS

Patent Abstract of Japan, vol. 014, No. 182 (E-916) Apr. 12, 1990 & JP-A-20 32 688 (Hitachi Ltd.) 2 Feb. 2, 1990.
IEEE Global Telecommunications Conference & Exhibition, Nov. 1988, Hollywood, Fla., US, pp. 1073-1079, XP000079274 DOI et al., "Adaptive DCT Coding For Home Digital VTR", p. 1073, left column, par. 1, p. 1074, right column, par. 3, p. 1075, right column, par. 2, FIGS. 2-3, 8.
IEEE Transaction On Consumer Electronics, vol. CE-35, No. 3, Aug. 1989, New York, US, pp. 450-457, XP000065969, Yamamitsu et al., "An Experimental Study For a Home-Use Digital VTR", p. 454, left column, line 1, p. 455, right column, par. 1, FIGS. 6-7.

Primary Examiner—Howard W. Britton
Attorney, Agent, or Firm—Wenderoth, Lind & Ponack

[57] ABSTRACT

In the recording apparatus and reproducing apparatus employing variable length coding, a formatting which prevents propagation of error due to transmission route error is realized. The input quantized value is coded in variable length and recorded in a first memory. The variable length code words recorded in the first memory are read out and formatted, and recorded into a second memory. In reproduction, the quantized value is decoded in the reverse sequence. By executing variable length coding and formatting in a pipeline operation by using two memories, high speed input signals such as moving picture signals can be formatted. Components of the recording apparatus and reproducing apparatus can be shared, and the circuit scale may be effectively reduced.

12 Claims, 30 Drawing Sheets

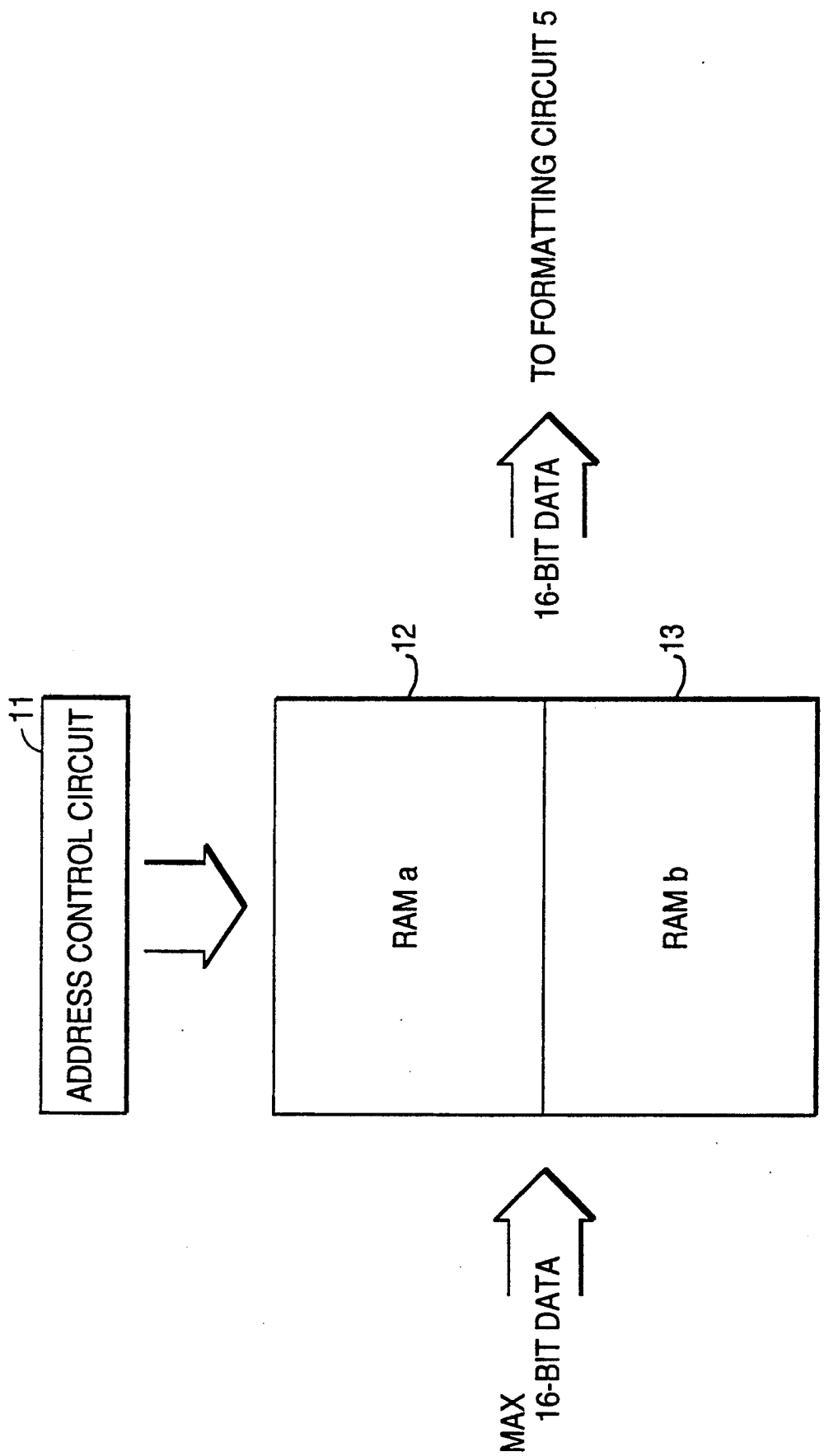

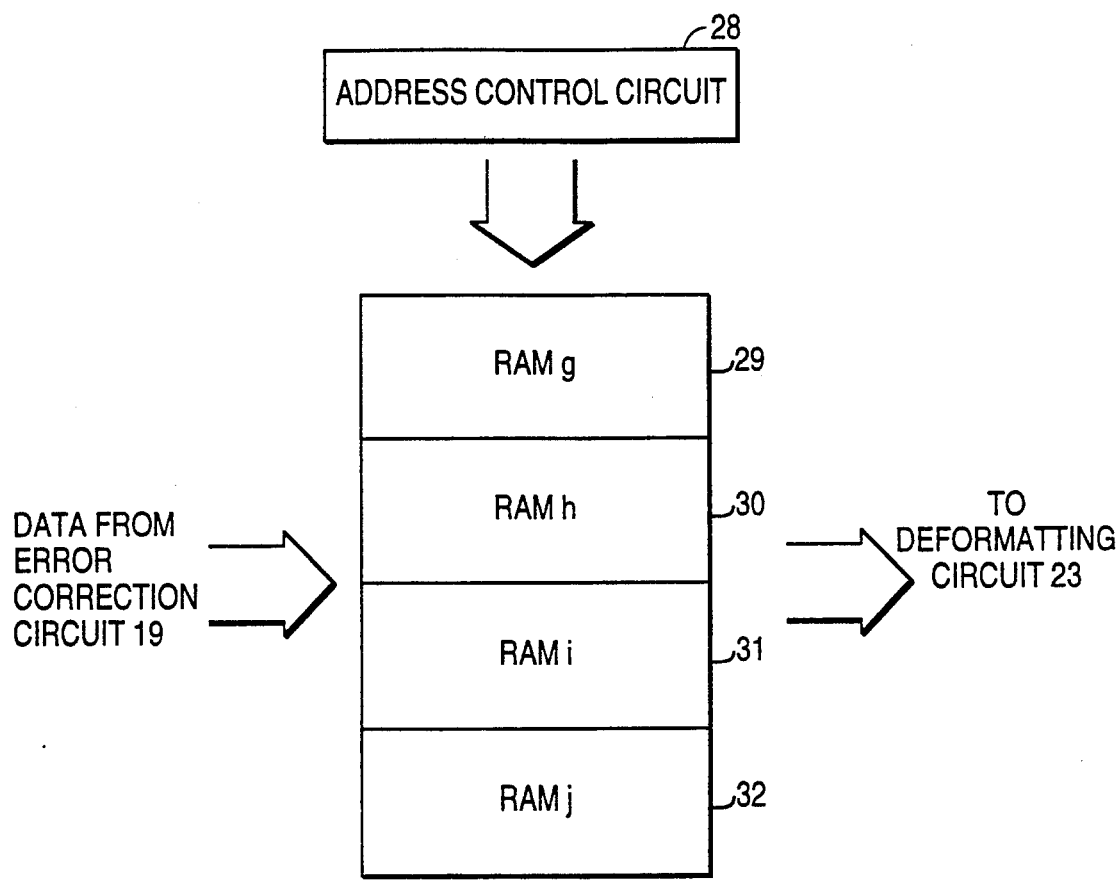
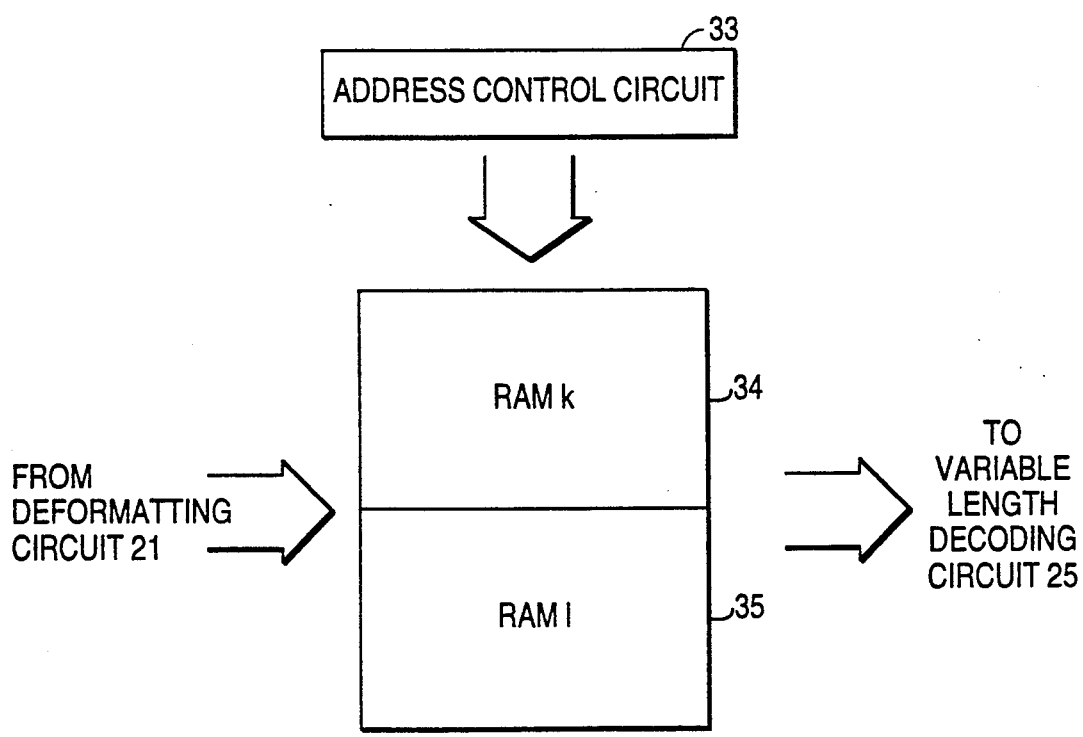

FIG. 15
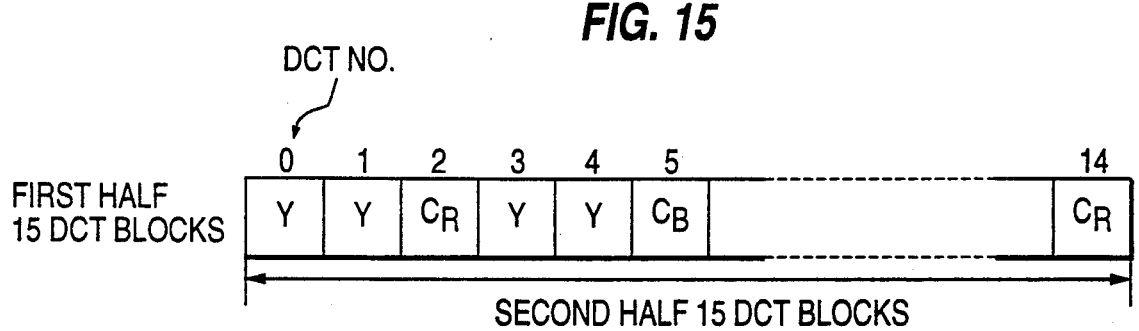
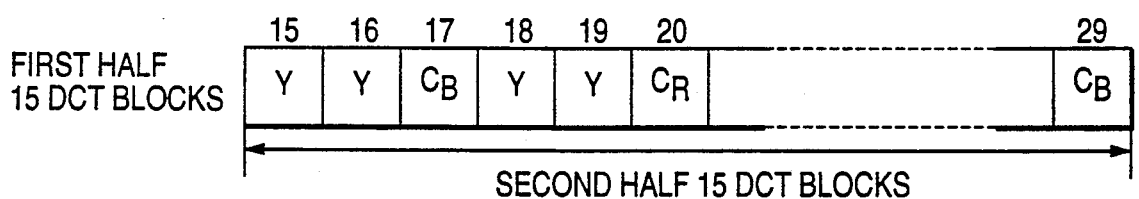
FIG. 13
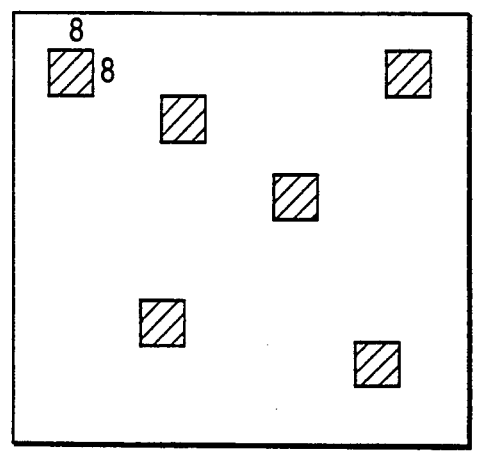

FIG. 14

DC COMPONENT

LOW RANGE / HORIZONTAL DIRECTION HIGH RANGE

| 1  | 3  | 4  | 10 | 11 | 21 | 22 | 36 |
|----|----|----|----|----|----|----|----|
| 2  | 5  | 9  | 12 | 20 | 23 | 35 | 37 |
| 6  | 8  | 13 | 19 | 24 | 34 | 38 | 49 |
| 7  | 14 | 18 | 25 | 33 | 39 | 48 | 50 |
| 15 | 17 | 26 | 32 | 40 | 47 | 51 | 58 |
| 16 | 27 | 31 | 41 | 46 | 52 | 57 | 59 |
| 28 | 30 | 42 | 45 | 53 | 56 | 60 | 63 |
| 29 | 43 | 44 | 54 | 55 | 61 | 62 | 64 |

VERTICAL DIRECTION HIGH RANGE

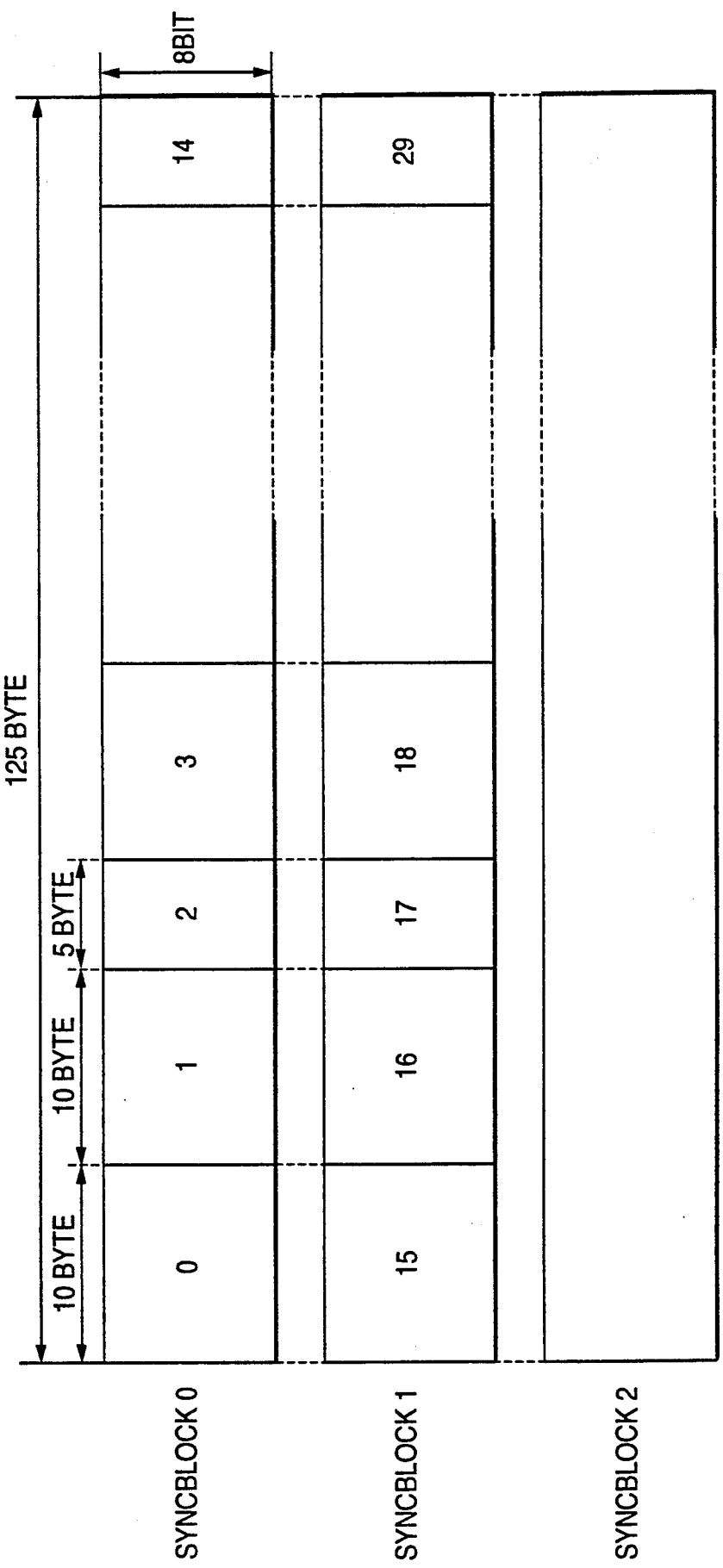

SHADED AREA DENOTES INVALID DATA

FIG. 22

| TIME | CODE WORD DATA | CODE LENGTH | SIGN FLAG | REGISTER 9 | REGISTER 10 | REGISTER 6 | CARRY REGISTER 5 |
|---|---|---|---|---|---|---|---|
| $t_0$ | a (bits 0-6) | 5 | 1 | (empty) | (empty) | 15 | 0 |
| $t_1$ | b (bits 0-10) | 10 | 0 | (empty) | a (bits 16-?) | 5 | 1 |
| $t_2$ | c (bits 0-8) | 7 | 1 | a (bits 0-6) | (empty) | 15 | 0 |
| $t_3$ | d (bits 0-12) | 11 | 1 | a,b (bits 0-6, 7-15) | c (bits 16-?) | 7 | 1 |
| $t_4$ | e (bits 3-4) | 4 | 0 | c (bits 0-7) | d | 3 | 1 |
| $t_5$ | f (bits 0-14) | 13 | 1 | d, e (bits 0-7, 8-15) | (empty) | 7 | 0 |
| $t_6$ | eob (bits 5-6) | 6 | 0 | d, e | f | 5 | 1 |
| $t_7$ | ......... | | | f, eob | (empty) | 11 | 0 |

COMPOSITION OF VRAM

SHADED AREA DENOTES INVALID DATA

FIG. 30

| TIME | REGISTER 31 (lsb 0 — msb 15) | REGISTER 30 (lsb 16 — msb 31) | CODE LENGTH | SIGN FLAG | REGISTER 35 | CARRY SIGNAL | SELECTOR 32 OUTPUT (0 — 15) |
|---|---|---|---|---|---|---|---|
| $t_0$ | (empty) | (empty) | | | | | a |
| $t_1$ | a / b (5 6) | a / b | 5 | 1 | 15 | 1 | b |
| $t_2$ | a / b (7 8) | c / d | 10 | 0 | 5 | 0 | c |
| $t_3$ | c / d (3 4 7 8) | c / d | 7 | 1 | 15 | 1 | d |
| $t_4$ | d / e / f (7 8) | e / f / eob | 11 | 1 | 7 | 1 | e |
| $t_5$ | d / e / f (5 6) | f / eob / ▨ | 4 | 0 | 3 | 0 | f |
| $t_6$ | f / eob / ▨ | (empty) | 13 | 1 | 7 | 1 | eob |
| | | | 6 | 0 | 5 | 0 | |
| | | | | | 15 | 0 | |

VARIABLE LENGTH CODING OUTPUT

AFTER FORMATTING

INFORMATION RECORDING/REPRODUCING APPARATUS

BACKGROUND OF THE INVENTION

1. Field of the Invention

The present invention relates to a recording apparatus for recording video information or audio information by variable length coding and to a reproducing apparatus for reproducing the recorded information.

2. Description of the Prior Art

To replace the analog video tape recorder (VTR) for recording a video signal on a magnetic tape directly as an analog signal, recently, it is being promoted to develop and commercialize a digital VTR which converts the video signal from analog signal into digital signal, and processes and records the digital signal, with the purpose of improving the picture quality and preventing deterioration at the time of dubbing, for example.

Its operation is explained below by reference to the block diagram of a signal processing unit in FIG. 31.

The video signal which is converted from analog to digital (A/D) by the known art is fed into a discrete cosine transform (DCT) circuit 401 in order to undergo DCT for the purpose of data compression. In the DCT circuit 401, DCT is conducted in a unit of 8 pixels×8 pixels (hereinafter called a DCT block), and the transformed signal is produced in the unit of 1 pixel into a quantizing circuit 402 (the data of 64 transformed pixels is produced by 1 DCT). In the quantizing circuit 402, the input data is quantized by every 1 pixel, and is put into a variable length coding circuit 403 for coding at high efficiency. In the variable length coding circuit 403, according to a known algorithm such as two-dimensional Huffman code (to determine the code word from the number of zero runs and the succeeding non-zero values, and the greater the number of zeros in the input data, the smaller becomes the number of code words in the DCT block), the data is converted into variable length code according to the zero run length and amplitude value of the quantized data, and the output is sent into an error correction coding circuit 404. The length of the output data row of the variable length coding circuit 403 varies with the quantized value and is not in a constant length. In the error correction coding circuit 404, an error correction code such as Reed Solomon code is added so that the error occurring at the time of reproduction may be corrected, and its data row is produced to a modulation circuit 405. The output data row is modulated in the modulation circuit 405, and is recorded and amplified in a recording circuit 405, and is recorded on a tape 500 through a magnetic head 407.

In reproduction, the signal reproduced from the tape 500 by the magnetic head 407 is sufficiently amplified in a reproduction amplifying circuit 408, and demodulated in a demodulation circuit 409, and is put into an error correction circuit 410. In the error correction circuit 410, the error occurring due to dropout or the like on the tape is checked, and the corrected data is put into a variable length decoding circuit 411. The variable length decoding circuit 411 decodes the zero run length and amplitude value from the signal coming out of the error correction circuit 410. An inverse quantizing circuit 412 inversely quantizes the amplitude value including the obtained zeros and con obtain the signal generated right after DCT. This signal is converted into a signal on the time axis by an inverse DCT circuit 413, and an analog video signal is produced through a digital/analog conversion circuit (not shown), and is interfaced with a monitor or device apparatus.

In this conventional constitution, however, since the signal is put into the error correction coding circuit 403 right after variable length coding, the data is recorded in the tape continuously from the low frequency components to high frequency components in one DCT block. That is, assuming the data array in the DCT block unit, it is regarded as follows:

(DCT1: low range to high range) to (DCT2: low range to high range) to (DCT3: low range to high range), and so forth.

Therefore, in reproduction, when a data string that cannot be corrected in the error correction circuit 410 because of a large error scale occurs, since variable length coded signals are recorded, it is impossible to distinguish the divisions of data, and the data after the error onset cannot be used at all, that is, normal reproduction after the error is disabled, and moreover it is practically impossible to realize special reproduction such as high speed reproduction that does not trace the recording tracks normally, involving a high risk of occurrence of such error.

To realize such format, however, the data once coded in variable length must be reshuffled, which requires complicated circuitry and a very large memory. In particular, it can not be applied an apparatus requiring real time processing at high speed, such as moving picture processing.

It is hence a primary object of the invention to solve the problems of the conventional recording apparatus and reproducing apparatus.

SUMMARY OF THE INVENTION

To achieve the above object, the information recording apparatus of the invention comprises coding means for coding digitized video signals in a specific unit, first memory means for recording the output of the coding means, formatting means for reshuffling the output data strings of the first memory means into specified data strings, and second memory means in which data is read and written by the formatting means.

The information reproducing apparatus of the invention comprises first memory means for recording data strings entered in a specific format, deformatting means for organizing the output data of the first memory means into data strings of code words, and second memory means in which data is read and written by the deformatting means.

The invention also presents an apparatus wherein video pixel data is converted into small blocks each composed of a specified number of pixels, the pixel components in small blocks are transformed so that the redundancy may be easily removed, the transformed pixel components are quantized and coded in variable length, and the recording block of a fixed length is determined in each small block, and the variable length code word in each variable length coded small block is recorded into the recording blocks according to the predetermined format, and transmitting, which is an information recording apparatus comprising variable length coding random access memory (VRAM), formatting random access memory (FRAM), VRAM recording means for writing transformed pixel components in each small block into the VRAM without allowing gap while coding in variable length, formatting means for writing the variable length code words in every small block written into the VRAM by the VRAM recording means into the FRAM in every variable length code word according to the format, and means for transmitting the formatted data written in the FRAM.

The invention also presents an apparatus for reproducing the data recorded and transmitted in the recording blocks according to the specified format, which is an information reproducing apparatus comprising two memories, that is, VRAM and FRAM, deformatting means for writing the formatted data being transmitted into the FRAM, classifying the data written in the FRAM into small blocks in every variable length code word, and writing into the VRAM, and variable length decoding means for decoding the variable length code words in every small block written into the VRAM by the deformatting means in variable length, and decoding into transformed pixel components.

The invention also presents an apparatus for recording or reproducing the format, being an information recording/reproducing apparatus consisting of an information recording apparatus comprising two memories, that is, VRAM and FRAM, VRAM recording means for writing the transformed pixel components in every small block into the VRAM without allowing gap while coding in variable length, formatting means for writing the variable length code words in every small block written into the VRAM by VRAM recording means into the FRAM in every variable length code word according to the format, and means for transmitting the formatted data written in the FRAM, and an information reproducing apparatus comprising deformatting means for writing the formatted data being transmitted into the FRAM, classifying the data written into the FRAM into each small block in each variable length code word and writing into the VRAM, and variable length decoding means for decoding the variable length code words in every small block written into the VRAM by the deformatting means in variable length and decoding into the transformed pixel components, in which the VRAM recording means and variable length decoding means, or the formatting means and deformatting means are used commonly in a same circuit by changing over by a switch.

The invention also presents an information recording/reproducing apparatus being a recording/reproducing apparatus comprising small block forming means for collecting sample values of input signals and forming small blocks in every m×n pixels, orthogonal transforming means for orthogonally transforming in every small block, quantizing means for quantizing the orthogonal components obtained by the orthogonal transforming means, and variable length coding means for coding the output of the quantizing means into variable length coded data, thereby recording the variable length coded data in a specified format, which also comprises memory means having a store area group in a fixed word length intrinsic to each small block for storing only the variable length coded data in every small block, and store areas common to all small blocks for storing the variable length coded data that cannot be stored in the store areas in the fixed word length.

The invention also presents an information recording/reproducing apparatus comprising small block forming means for collecting sample values of input signals and forming small blocks in every m×n pixels, grouping means for collecting a specific number of small blocks and dividing into two groups A and B, orthogonal transforming means for transforming orthogonally in every small block, quantizing means for quantizing the orthogonal components obtained by the orthogonal transforming means, and variable length coding means for coding the output of the quantizing means into variable length coded data, whereby recording the variable length coded data into a specific format, which also comprises memory means comprising a store area group in a fixed word length intrinsic to each small block for storing only the variable length coded data in every small block, and store areas common to all blocks for storing the variable length coded data that cannot be fully stored in the fixed store areas, wherein, when storing into common store areas, the variable length coded data in the small blocks belonging to group A are stored from the beginning address toward the final address in the common store areas, while the variable length coded data of the small blocks belonging to group B are stored from the final address toward the beginning address.

The invention also presents a recording/reproducing apparatus for coding digital information signals into variable length code data and recording in a specific format, comprising means for detecting the code length of the variable length code data, addition means for cumulatively adding the code lengths, and selector means for selecting the output value by the output of the addition means, wherein the selector means receives the variable length code data and the output data of one time before of the selector means as input signals, and selects the data of specific word length from the input signal depending on the output of the addition means.

The invention also presents an information recording/reproducing apparatus for coding digital information signals into variable length code words, and reproducing the signals recorded in a specific format, comprising a register A for temporarily storing the code data packed in a specific word unit, a register B for selecting whether to temporarily store the value of the register A or to hold the value one time before, selector means for cutting out the variable length code word form the code data on the basis of the output values of the register A and register B, code length detecting means for detecting the code length of the variable length code word cut out by the selector means, and addition means for cumulatively adding the code lengths which are outputs of the code length detecting means, and controlling the select position of the selector by its output and the selection action of the register B.

BRIEF DESCRIPTION OF THE DRAWINGS

FIG. 2 is a structural diagram of a memory circuit 4 in the same embodiment;

FIG. 6 is a structural diagram of a memory circuit 22 in the same embodiment;

FIG. 7 is a structural diagram of a memory circuit 24 in the same embodiment;

FIG. 13 is a schematic diagram showing the relation of one frame and DCT block of video signal;

FIG. 14 is a schematic diagram showing the output sequence of frequency components after DCT;

FIG. 15 is a diagram showing the transmission sequence of video segmented DCT blocks;

FIG. 16 is a structural diagram of three sync blocks (syncblock0, syncblock1, syncblock2);

FIG. 22 is a status diagram showing a mode of shuffling code word data at every time in the same apparatus;

FIG. 30 is a status diagram showing the mode of shuffling of code word data at every time in the same apparatus;

DESCRIPTION OF THE PREFERRED EMBODIMENTS

Figure 1:
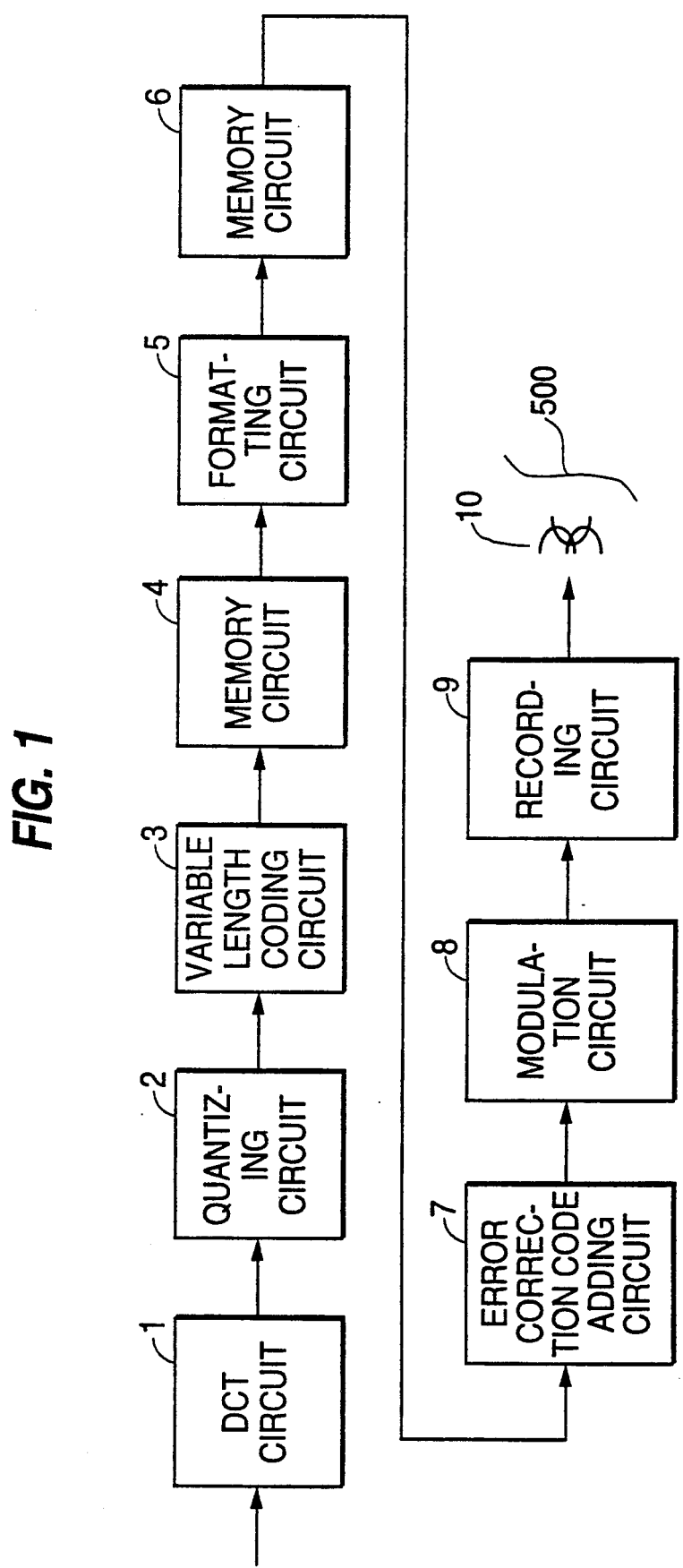
FIG. 1 is a block diagram of a signal processing unit in an embodiment of a recording apparatus of the invention.

Referring now to the drawings, some of the preferred embodiments of the invention are described in detail below.

Figure 32A:
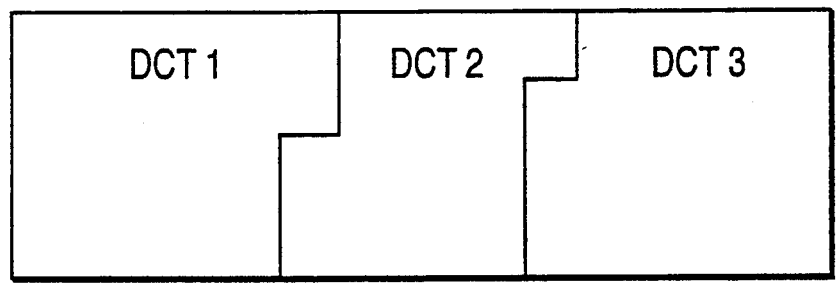
FIGS. 32(a) and 32(b) are explanatory is a distribution diagram of an explanatory diagrams of formatting.
Figure 32B:
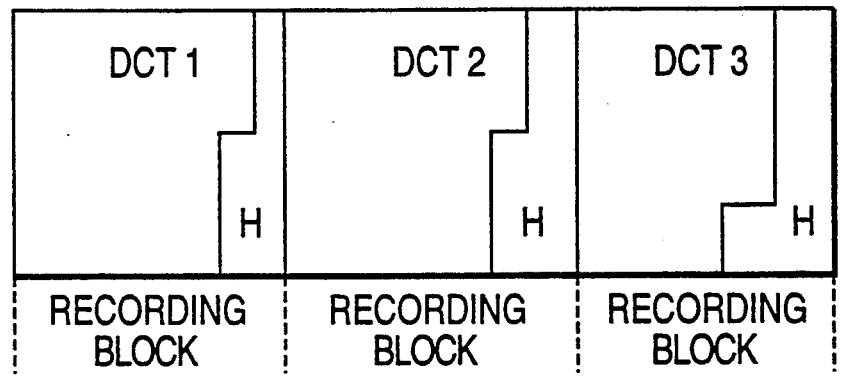

FIGS. 32(a) and 32(b) are explanatory diagrams of formatting in which an error, if taking place, does not affect other small blocks. In FIG. 32, the discrete cosine transformation (DCT) is used as the method of transformation, and small blocks correspond to the basic units (DCT blocks) for executing the DCT. FIG. 32 (a) denotes the rate of the data after variable length coding of the transformed components in three small blocks. Since the data quantity after variable length coding depends on its input information, the data quantity varies in each block as shown in FIG. 32 (a). Therefore, if an error occurs in a first small block to deviate the variable length code synchronism, the beginning position cannot be detected in the second and third small blocks, thereby resulting in failure of decoding in all three small blocks. By contrast, in FIG. 32 (b), first the data region after variable length coding is divided into three recording blocks. Then the recording blocks are written from the beginning sequentially from the variable length code word expressing the low region of each DCT block. If the number of remaining bits of each recording block becomes smaller than the maximum code length of variable length coding used therein, writing is once stopped there. By thus operating, the series of consecutive variable length code words written from the beginning of the recording block is not interrupted in the midst of a code word. Next, the variable length code words not written in the recording block at this stage are recorded into an empty region including the other recording blocks. Therefore, only the code words of high range not important visually are written into the recording blocks other than the corresponding recording blocks (the portion indicated by H in FIG. 32 (b). By thus formatting, if an error occurs in one small block, decoding is resumed in other small blocks from the beginning of the recording block, so that the effects of an error may be kept to a minimum limit.

FIG. 1 is a block diagram of a signal processing unit of a recording apparatus in an embodiment of the invention. As in the prior art, the video signal digitized by analog-to-digital (A/D) conversion is fed into a discrete cosine transform (DCT) circuit 1 to undergo DCT for the purpose of data compression. In the DCT circuit 1, DCT is performed in each DCT block, and the transformed signal is produced into a quantizing circuit 2 from the data of the low frequency region (low band) in the unit of 1 pixel (the data of 64 transformed pixels is produced per 1 DCT, and the parallel data string comprises 8 bits per pixel). In the quantizing circuit 2, the input data is quantized in each pixel, and is sent out into a variable length coding circuit 3 for coding at high efficiency. In the variable length coding circuit 3, according to the known algorithm such as two-dimensional Huffman code, the data is transformed into codes of variable length on the basis of the 0 run length and amplitude value of the quantized value, and the parallel data strings of maximum 16 bits are output into a memory circuit 4. The memory circuit 4 comprises, as shown in FIG. 2, an address control circuit 11, and two RAMs (random access memories, RAMa 12, RAMb 13) in which the write/read address is controlled by it, and these RAMs are assigned with 16 bits per address, that is, the maximum number of bits of one variable length code word, and the storage capacity is set at a value capable of storing the variable length coded data strings for 30 DCT blocks (hereinafter called one video segment), respectively. The address control circuit 11 controls the address so as to write the input data strings sequentially from the head address of the RAMa 12, and when data is written in all addresses of the RAMa 12, that is, in 1 video segment, the address is transferred to the head of the next RAMb 13, and the address is controlled so that the data strings may be sequentially written into the RAMb 13 from this head address. At the same time, the RAMa 12 changes from the write mode into the read mode, and the data strings are sent out into the formatting circuit 5 from the head address by the address control circuit 11. Next, when the data strings are written into all addresses in the RAMb 13, this time, the RAMb 13 is changed to the read mode, and the data strings are sent into the formatting circuit 5 from the head address, while the RAMa 12 is changed to the write mode, and the data strings are written in from the variable length coding circuit 3. Such action is repeated, and the data coded in variable length is output into the formatting circuit 5.

Figure 3A:
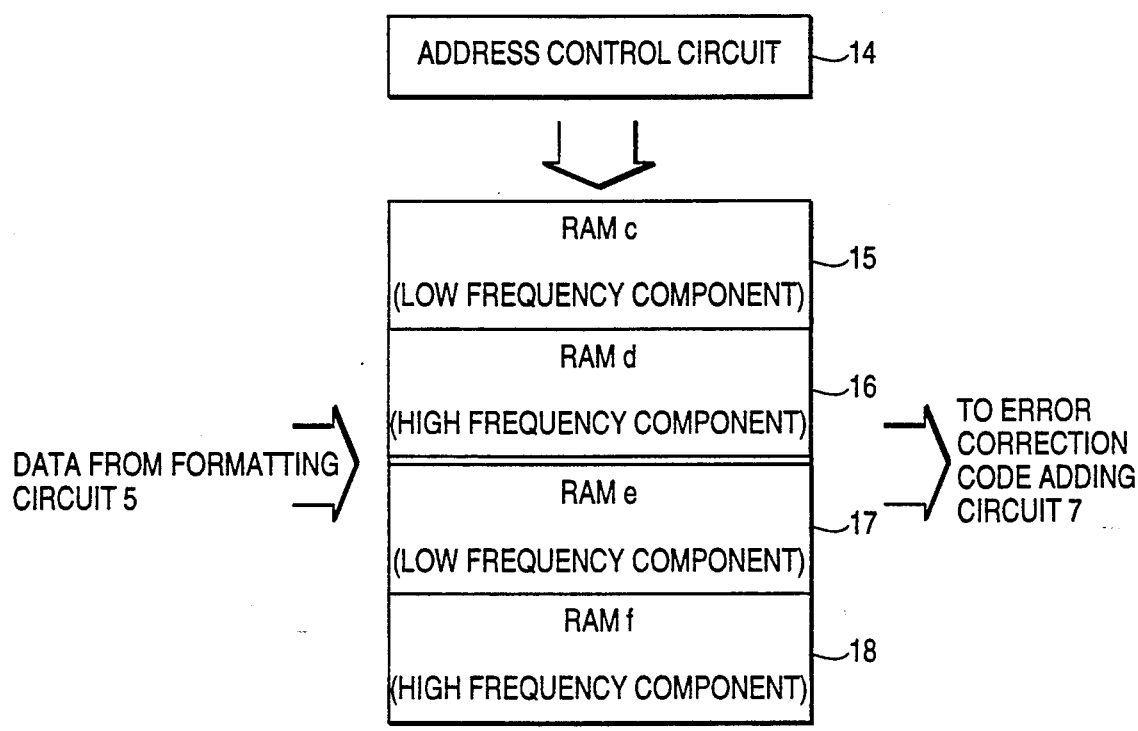
FIG. 3 (a) is a structural diagram of a memory circuit 6 in the same embodiment, FIG. 3 (b) is a data layout diagram on a RAM in the memory circuit 6 in the same embodiment.
Figure 3B:
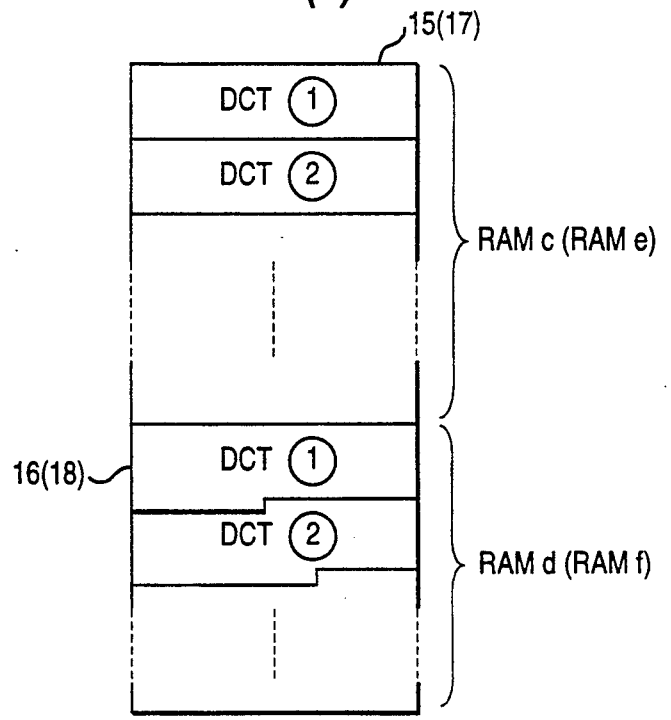
Figure 4:
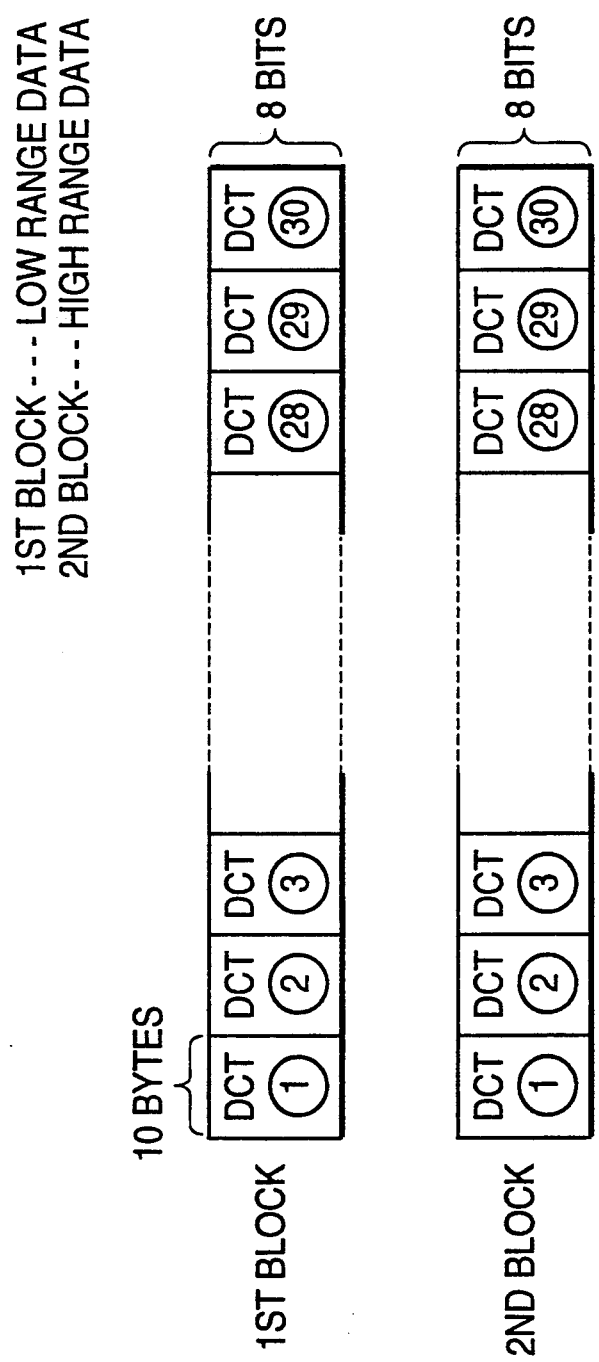
FIG. 4 is a data layout diagram being formatted by the same embodiment.

The formatting circuit 5 divides the data strings of 1 video segment, in cooperation with a memory circuit 6, into two blocks, that is low frequency component (first block) and high frequency component (second block), in every DCT block as shown in FIG. 4. The memory circuit 6 comprises, as shown in FIG. 3, an address control circuit 14, and four RAMS (RAMc 15, RAMd 16, RAMe 17, RAMf 18) in which write/read addresses are controlled by it, and these RAMs are assigned with 8 bits in every address. The operation of the formatting circuit 5 and memory circuit 6 is explained below. The formatting circuit 5 writes the data strings of a specific number of bytes (in this embodiment, 10 bytes=80 bits) from the head address corresponding to the DCT block, out of the variable length data strings in every 1 DCT block sequentially produced from the memory circuit 4, into the RAMc 15 sequentially from the head address. At this time, the formatting circuit 5 sends the data to the RAMc 14 every time 8 bits of the memory corresponding to one address are filled up, regardless of the unit of the variable length code, if within the same DCT block, and the address control circuit 14 does not update the address until then, that is, within 1 DCT block unit, as shown in FIG. 3(b), the data is filled up sequentially from the most significant bit (MSB) of the head address corresponding to the DCT block. When the data for 10 bytes is written into the RAMc 15, the address control circuit 14 specifies an address not filled up with all 8 bits in the RAMd 16, and the formatting circuit 5 writes the remaining data in the DCT block processed at the present from the beginning of vacant bits of that address into the RAMd 16 until the end. Therefore, as shown in FIG. 3(b), data of different DCT blocks may coexist at a same address. At the end of each DCT block, however, in order to distinguish from the next block, the end-of-block (EOB) code is added. Here, the address control circuit 14 updates the address every time the data of 8 bits is filled up. When writing of the data strings of one DCT block into the RAMd 16 is over, the address control circuit 14 transfers the address again to the beginning corresponding to the next DCT block of the RAMc 15. Thereafter, the same as above, the formatting circuit 5 writes the data of 10 bytes, and writes the remaining data into the RAMd 16. By repeating such action, the data strings of 1 video segment are written into the RAMc 15, RAMd 16, when the address control circuit 14 shifts the address to the beginning of the next RAMe 17, thereby controlling the address so that the data strings may be sequentially written into the RAMe 17 from this head address, the same as in the RAMc 15. At the same time, the RAMc 15, RAMd 16 are changed from the write mode into the read mode, and thus formatted data strings are sent out from the head address of the RAMc 15 into the error correction code adding circuit sequentially from the head address by means of the address control circuit 14. The RAMe 17 is the same as the RAMc 15, and when the data strings for 10 bytes of the DCT block are written in, the remaining data strings are written into the RAMf 18 in a filled state the same as in the RAMd 16. When the data strings for the portion of 1 video segment are written into the RAMe 16, RAMf 17, these RAMs are set in read mode, and they are put into the error correction code adding circuit 7, the same as in the foregoing RAMs, and the RAMc 15, RAMd 16 are set in the write mode, and the data strings from the formatting circuit 5 are written in the same manner as above. This operation is repeated, and each DCT block in 1 video segment is formatted, being divided in a first block of a fixed length filled up from the data of the low frequency components, and a second block of a variable length consisting of the remaining high frequency component data, as shown in FIG. 4. Here, the first block and second block are not divided by a specific frequency, but the data of the second block is the extra data not entering the first block when filling up sequentially from the low frequency data. As a result, the second block contains data of higher frequency than the first block.

Consequently, the data strings coming out of the memory circuit 6 are combined with error correction codes by the error correction code adding circuit 7, and are recorded, as in the prior art, in a tape 500 by way of modulation circuit 8, recording circuit 9 and magnetic head 10. In the tape 500, accordingly, each DCT block is recorded separately for the low frequency components and high frequency components.

Figure 5:
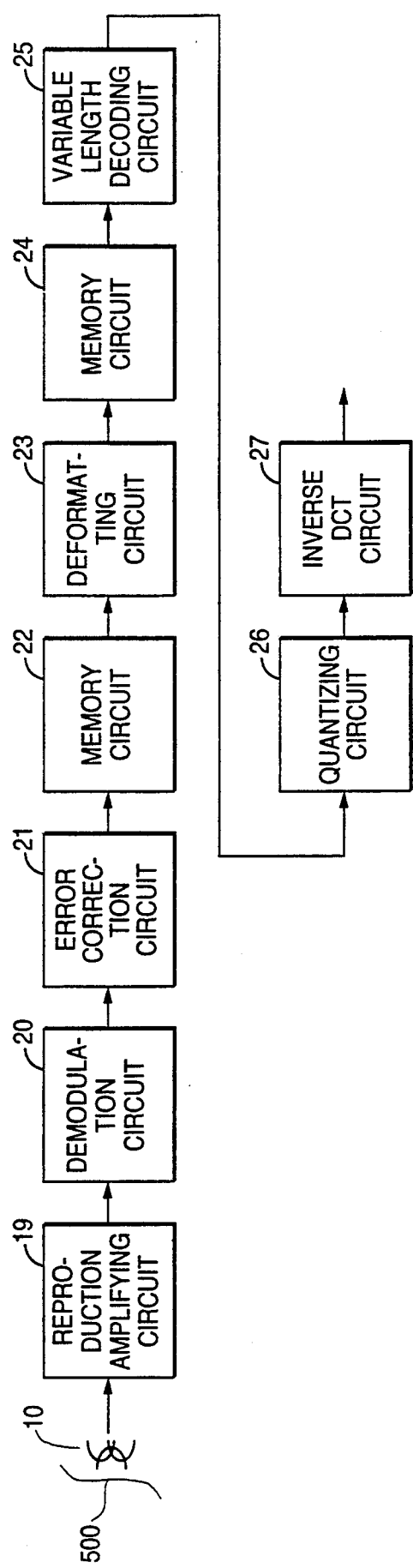
FIG. 5 is a block diagram of a signal processing unit in an embodiment of a reproducing apparatus of the invention.

A reproducing apparatus for reproducing thus recorded signals is explained below while referring to drawings. FIG. 5 is a block diagram of a signal processing unit of a reproducing apparatus in an embodiment of the invention. In reproduction, the signal reproduced by the magnetic head 10 is sufficiently amplified in a reproduction amplifying circuit 19, and is demodulated in a demodulation circuit 20, and put into an error correction circuit 21. In the error correction circuit 21, the error caused by dropout or the like on the tape is checked and corrected, and the corrected data is sent into a memory circuit 22. The memory circuit 22 comprises, as shown in FIG. 6, four RAMs, RAMg 29, RAMh 30, RAMi 31, RAMj 32, and an address control circuit 28 for controlling their addresses. The data string entering the memory circuit 22 is controlled in address by the address control circuit 28, and the data of the first block (low frequency data) of each DCT block is first sequentially written into the RAMg 29, and after writing of the first block, the data of the second block (high frequency data) is written into the RAMh 30. When the data strings of one video segment are written into the RAMg 29, RAMh 30, the address control circuit 28 controls the address so that the data of the first block of the next video segment may be sequentially written into the RAMi 31, and the data of the second block, into RAMj 32. At the same time, the RAMg 29, RAMh 30 are changed from the write mode into the read mode, and the data is output into a deformatting circuit 23. The deformatting circuit 23 comprises a memory circuit 22, two RAMs shown in FIG. 7, RAMk 34, RAMl 35, and an address control circuit 33 for controlling their addresses, and these RAMs deformat the data strings of the DCT block formatted in two blocks by using a memory circuit 24 having a 16-bit width equivalent to the maximum number of bits of one variable length code per address, into data strings of one variable length code unit. This operation is described below. The deformatting circuit 23 controls the address control circuit 28, and first feeds the 10-byte data which is the low frequency data of the first DCT block from the RAMg 29, from the head address of the RAMk 34 of the memory circuit 24 sequentially, and when the movement of the data in the low frequency range is over, the deformatting circuit 23 next controls the address control circuit 28, shifts the address to the head address of the RAMh 30, thereby producing sequentially the high frequency data of this DCT block. Simultaneously, the deformatting circuit 23 controls the address control circuit 33 of the memory circuit 24, and fills up the high frequency data sequentially from the address not filled at all with the bits of the RAMk 34. By repeating this operation, the data strings for one video segment accumulated in the RAMg 29, RAMh 30 are fed into the RAMk 34 of the memory circuit 24 in the sequence of the DCT blocks. Therefore, in the RAMk 34, the data of low frequency and high frequency are not distinguished. Next, when the data of one video segment is fed into the RAMk 34, the RAMk 34 is changed to the read mode, and this data string is delivered to a variable length decoding circuit 25 in the sequence of addresses. At the same time, the deformatting circuit 23, in the same operation as above, feeds the data of the RAMi 31, RAMj 32 of the memory circuit 22 into the RAMl 35 of the memory circuit 24. Likewise, when shift of data for one video segment is over, returning to the beginning, the data of the newly updated RAMg 29, RAMh 30 is moved to the RAMk 34. Thereafter, as the state of reproduction continues, this action is repeated.

The data string sent out from the memory circuit 20 is decoded into 0 run length and amplitude value by the known art by detecting the length of each code from the determined bit pattern by the variable length decoding circuit 25, and is put into an inverse quantizing circuit 26. The inverse quantizing circuit 26 inversely quantizes the amplitude value including the obtained 0, and transforms into the signal obtained right after DCT at the time of recording. This signal is converted into a signal on the time axis by an inverse DCT circuit 27, and an analog video signal is delivered from a digital-/analog converting circuit (not shown), and is interfaced with a monitor or video appliance.

Thus, according to the embodiment, the data string coded in variable length is divided into two blocks in the unit of 1 DCT block, and the data of low frequency at fixed length is recorded in the first block and the data of high frequency at variable length in the second block, and these blocks may be recorded in the unit of one video segment. Therefore, if a large error occurs in reproduction, since the data of the first block has a fixed length and is recorded in the unit of 1 video segment, this portion may be normally reproduced when the error is eliminated, and propagation of error is avoided. Besides, in the case of special reproduction such as high speed reproduction not tracing the track accurately, by tracing only the first block, the low frequency region of signal can be reproduced, so that the reproduced image may be also monitored at the time of special reproduction.

In the foregoing embodiment, the recording apparatus and reproducing apparatus are distinct, but in a recording and reproducing apparatus integrally incorporating the recording and reproduction, needless to say, the memory circuit 4 in recording and memory circuit 24 in reproducing can be shared, and the memory circuit 6 in recording and memory circuit 22 in reproducing can be shared, too.

The formatter/deformatter circuit of the invention is described herein. For the sake of simplicity of explanation, we refer to an embodiment for realizing the format as shown in FIG. 32 (b). Therefore, the method of transformation is DCT. As the format, as shown in FIG. 32 (b), three recording blocks of a fixed length are set, the data is written in from the variable length code word expressing the low band of each corresponding DCT block (small block) from the beginning of each recording block. In this embodiment, therefore, one video segment is composed of three DCT blocks. The maximum code length of the variable length code is set at 16 bits, and when the number of remaining bits of each recording block becomes smaller than 16 bits, writing of variable length code word is stopped. In this way, when writing of the low frequency range of each recording block is over, the variable length code expressing the high frequency range not written up fully yet is written successively to the variable length code word expressing the low frequency range of each recording block (the portion indicated by H in FIG. 32 (b)). The variable length code word expressing the high frequency range is written into three DCTs sequentially without gap from the remaining space of the recording blocks corresponding to DCT 1. Accordingly, the variable length code signal expressing the high frequency range is not always written into the corresponding recording block.

This explanation relates to a recording apparatus or reproducing apparatus corresponding to a case of input of quantized value after DCT and quantizing as mentioned above. To simplify the explanation, since the maximum code length of the variable length code is set at 16 bits, the input and output bit width of FRAM and VRAM in the explanation is set at 16 bits.

Figure 8:
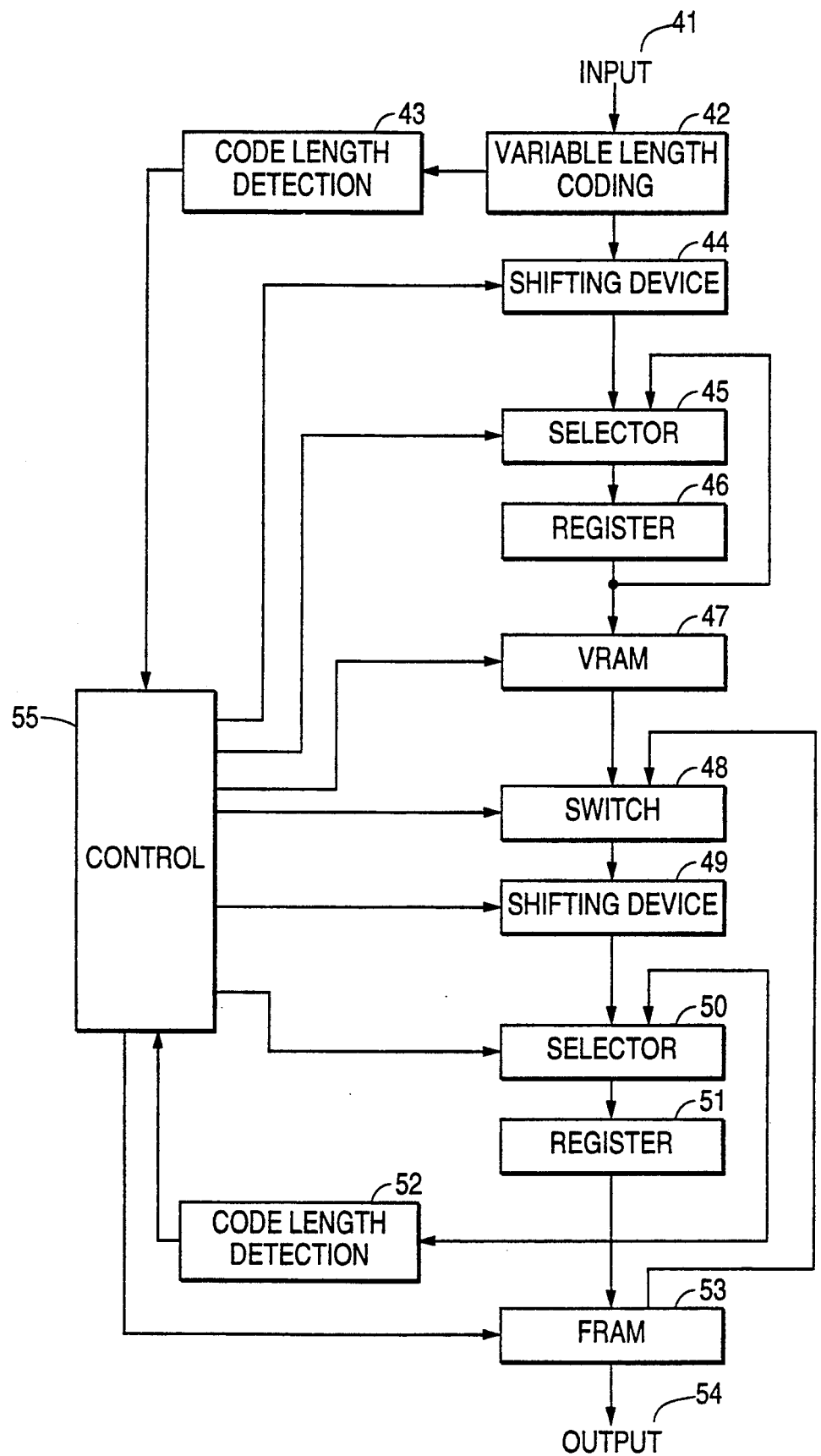
FIG. 8 is a block diagram of an embodiment of a recording apparatus of the invention.

FIG. 8 is a block diagram of a recording apparatus of the invention. In FIG. 8, a numeral 41 is an input unit, 42 is a variable length coding unit, 43 is a code length detecting unit, 44 is a shift device, 45 is a selector, 46 is a register, 47 is a first memory VRAM (variable length RAM), 48 is a switch, 49 is a shift device, 50 is a selector, 51 is a register, 52 is a code length detector, 53 is a second memory FRAM (formatting RAM), 54 is an output unit, and 55 is a control unit.

The operation of this embodiment is explained below. The quantized value entering from the input unit 41 is coded in variable length in the variable length coding unit 42. Simultaneously with variable length coding, in the code length detecting unit 43, the code length of the produced variable length code word is detected and fed into the control unit 55. The variable length code word delivered from the variable length coding unit 42 is shifted in turn by the shift device 44. This shift extent is controlled by the control unit 55 to the quantity in which the first bit of the presently entered variable length code word is positioned to the next bit of the final bit of one variable length cord word before. More specifically, the control unit 55 calculates the shift extent on the basis of the code length entered from the code length detection unit 43. The variable length code word shifted in turn in the shift device 44 is mixed with the series of the variable length code words up to one word before being stored in the register 46, in the selector 45, and stored in the register 46. If the series of the variable length code word over 16 bits not recorded in the VRAM 47 is stored in the register 46, the series of 16 bits is written into the VRAM from before. In this way, the variable length code word produced from the variable length coding unit 42 is transformed into bit strings of 16 bits each filled up without gap, and recorded in the VRAM 47.

Next is explained the method of recording the data filling up the VRAM 47 into the FRAM 53 in a form as shown in FIG. 32 (b) by formatting. To begin with, the method of writing the variable length code word expressing the low frequency range sequentially from the beginning of each recording block in FIG. 32 (b) is explained (writing of low frequency region). By the switch 48, the VRAM 47 is first selected as the input of the shift device 49. Then, the shift extent is controlled so that the data may be recorded without gap from the beginning of the recording block of the shift device 49, from the VRAM 47 entered through the switch 48. In the selector 50, the feedback of the register 51 is selected in the register 51 from the most significant bit to the final bit of the data already stored, and the input data from the shift device 49 is selected for the lower bits. The threshold value (bit position) of this selection is determined in the control unit 55 by using the shift extent in the shift device 49. It is thus possible to connect the already recorded data and the input data without gap, and this data is put into the register 51. At the same time, in the code length detecting unit 52, the code length of the code word starting from the position indicated by the head pointer of the code word on the present register is detected at every basic time. By adding thus obtained code length to the above pointer, the head pointer of the next code word is obtained. If the position of the head pointer of the code word of the register 51 exceeds the most significant bit by 16 bits, the data of the upper 16 bits is written into the FRAM 53. The content of the register 51 is shifted 16 bits upward by using the selector 50. At the same time, the head pointer of the code word is subtracted by 16 bits. In this way, when the data produced from the VRAM 47 is written sequentially into the FRAM 53, it is possible to detect how far the data is written in the recording blocks in the code word unit of the variable length code word. When the number of remaining bits of the recording block is less than 16, the data of the upper 16 bits of the register 51 is written into the FRAM 53. Once finishing the writing into the DCT block, writing of the next DCT block is started.

By executing such operation in three DCT blocks, the low frequency portion in FIG. 32 (b) is formatted. Below is explained the method of writing variable length code word corresponding to the high frequency range not written yet in the FRAM 53 (writing of high frequency range).

As shown in FIG. 32 (b), the low frequency portion and high frequency portion of each recording block are usually separated in the midst of one word (16 bits) of FRAM. In the first place, the final code word of the variable code word expressing the low range written at the present in the FRAM 53 is taken out, and the variable length code word expressing the high frequency range must be connected without pause behind it, and the code is written again from the FRAM 53. Therefore, first by changing over the switch 48, the output of the FRAM 53 is fed into the register 51 through the shift device 49 and selector 50. Next, changing over the switch 48, the variable length code word expressing the high frequency range is fed from the VRAM 47 into the shift device 49. Consequently the shift device 49 shifts the variable length code word expressing the high frequency range entered so as to connect without gap to the variable length code word expressing the low frequency range already stored in the register 51. The shifted variable length code word is mixed with the variable length code word expressing the low frequency range delivered from the register 51 in the selector 50, and is fed into the register 51. At the same time, in the code length detection unit 52, while detecting the code length of the variable length code word expressing the high frequency range, the data is written into the FRAM 53 the same as in writing of the low frequency range. In this way, the same process is repeated until the remaining space is used up in each recording block. Or, in the midst of processing, if all variable length code words corresponding to a certain DCT block are written, the processing is once stopped there, and the variable length code words of the high frequency range in the next DCT block are written in the same manner. Thus, the data formatted on the FRAM 53 is sequentially produced from the output unit 54.

By thus repeating a relatively simple process in this procedure, the format as shown in FIG. 32 (b) is realized. The invention may be applied thus in real time processing of high speed input data such as moving picture by using two memories, VRAM, FRAM.

Figure 9:
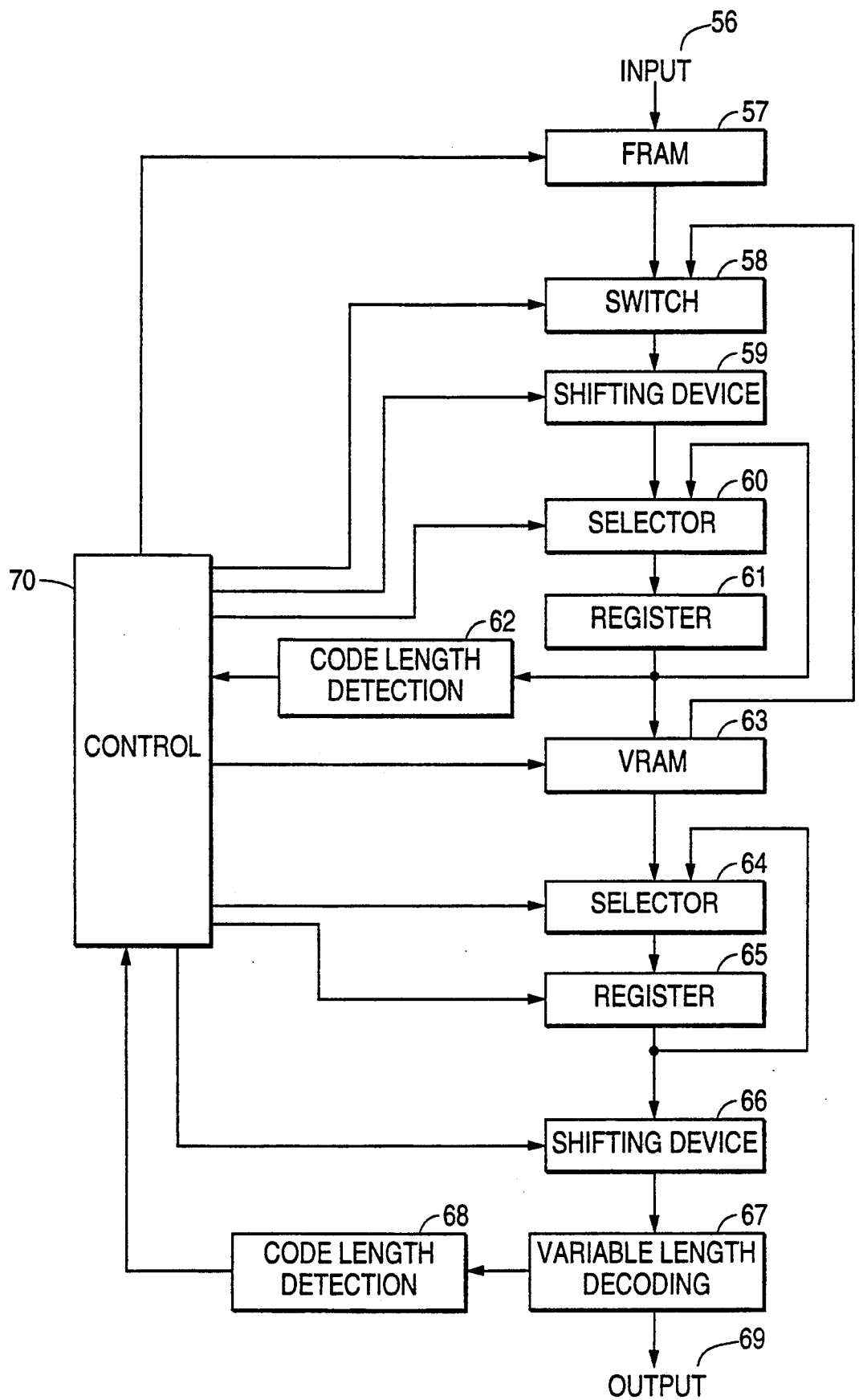
FIG. 9 is a block diagram of an embodiment of a reproducing apparatus of the invention.

Referring now to FIG. 9, an embodiment of the reproducing apparatus of the invention is described below. In FIG. 9, numeral 56 denotes an input unit of formatted data, 57 is a FRAM, 58 is a switch, 59 is a shift device, 60 is a selector, 61 is a register, 62 is a code length detection unit, 63 is a VRAM, 64 is a selector, 65 is a register, 66 is a shift device, 67 is a variable length decoding unit, 68 is a code length detection unit, 69 is an output unit, and 70 is a control unit.

The operation of this embodiment is explained herein. As shown in FIG. 32 (b), in order to separate the formatted data into DCT blocks and write into the VRAM, as in the case of formatting in the first embodiment, the low frequency portion is first written into the VRAM, then the high frequency portion is separated and written into the VRAM in each DCT block. This operation is called deformatting, which is described below.

The formatted data is put into the FRAM 57 from the input unit 56. The low frequency portion is transferred from the FRAM 57 into the VRAM 63 in the following procedure. By changing over the switch 58, the data of the FRAM 57 is fed into the register 61 through the shift device 59 and selector 60. At the same time, in the code length detection unit 62, the code length of variable length code word at every time is detected from the data of the register 61, thereby detecting to see how far the data is written in the position of the recording block in the variable length code word unit. In this way, when the series of the variable length code work in the register 61 exceeds 16 bits, the upper 16 bits of the register 61 are written into the VRAM 63. Meanwhile, when it is detected that the number of remaining bits of the recording block becomes smaller than 16 by code length detection, the upper 16 bits of the register 61 are written into the VRAM 63, and the processing of the low frequency range to that DCT block is terminated. By executing such processing in each DCT block, deformatting of the low frequency range is realized.

Deformatting of the high frequency range is as follows. In deformatting of the high frequency range, the same as in formatting, it is necessary to mix the variable length code in the low frequency range and the variable length code word in the high frequency range within 1 word (16 bits) on the VRAM. Accordingly, in the first place, by picking up the final code word of the variable length code word expressing the low frequency range written in the VRAM 63 at the present, the variable length code word expressing the high frequency range is connected behind it without gap, and written again into the VRAM 63. Accordingly, by first changing over the switch 58, the output of the VRAM 63 is fed into the register 61 by way of the shift device 59 and selector 60. Then changing over the switch 58, the variable length code word expressing the high frequency range is entered from the FRAM 57 into the shift device 59. The shift device 59 shifts the variable length code word expressing the high frequency range supplied so as to connect without gap with the variable length code word expressing the low frequency range already stored in the register 61. The shifted variable length code word is mixed with the variable length code word expressing the low frequency range delivered from the register 61 in the selector 60, and is fed into the register 61. At the same time, in the code length detection unit 62, while detecting the code length of the variable length code word expressing the high frequency range, the data is written into the VRAM 63 the same as in writing of low frequency range. In this way, the same process is repeated until no free space is left in each recording block. Or, in the midst of processing, when all variable length code words for a certain DCT block are completely written in, once processing is stopped, and the variable length code words in the high frequency range of the next DCT block are similarly written in. Thus, the deformatted data separated in each DCT block is recorded on the VRAM 63.

The method of variable length decoding of the deformatted data recorded in the VRAM 63 is explained below. First of all, the series of consecutive variable length code words coming out of the VRAM 63 are fed into a register 65 through a selector 64. In a shift register 66, the variable length code word coming out of the register 65 is shifted so that the beginning bit may come to the most significant bit, and fed into the variable length decoding unit 67. In the variable length decoding unit 67, the input variable length code word is decoded, converted into a quantized value, and produced from the output unit 69. At the same time, in the code length detection unit 68, detecting the code length of the decoded variable length code word, the head position of the next code word in the register 65 is determined. In this manner, decoding processing is effected on every variable length code word. If the quantity of data not decoded yet on the register 65 is smaller than 16 bits, new data is fed from the VRAM 63 by using the selector 64, and connected behind the data stored in the register 65, and is entered again in the register 65.

By executing such processing, the formatted data can be decoded into a quantizing value. In the invention, by using two memories, FRAM and VRAM, it is possible to realize a reproducing apparatus of input signals of high speed such as moving picture signals, by a relatively simple processing.

Figure 10:
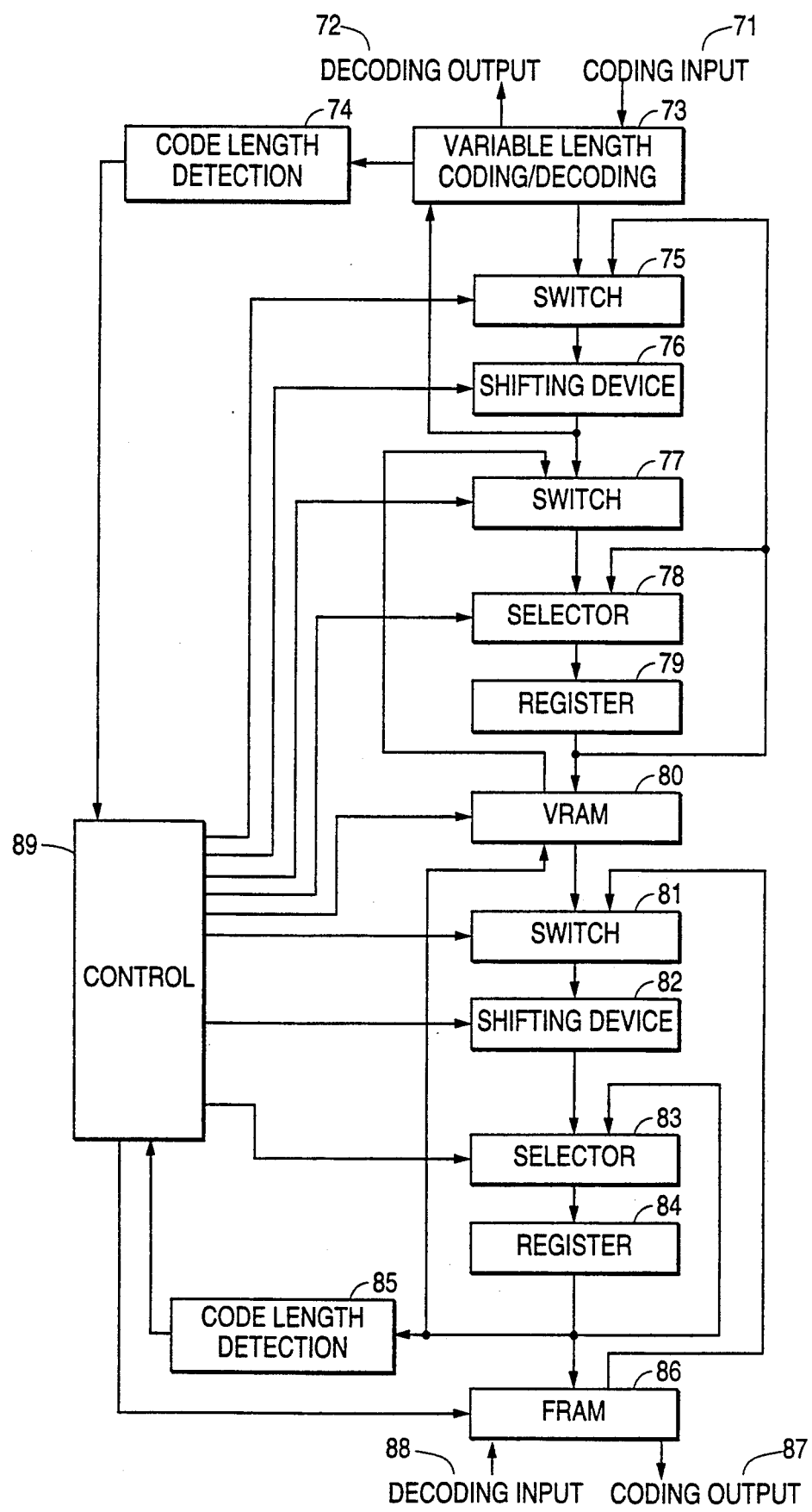
FIG. 10 is a distribution diagram of an embodiment of a recording/reproducing apparatus of the invention.

Finally, an embodiment of the apparatus capable of notably reducing the circuit scale by sharing the recording apparatus and reproducing apparatus is explained by reference to FIG. 10. In FIG. 10, numeral 71 denotes a coding input unit, 72 is a decoding output unit, 73 is a variable length coding/decoding unit, 74 is a code length detection unit, 75 is a switch, 76 is a shift device, 77 is a switch, 78 is a selector, 79 is a register, 80 is a VRAM, 81 is a switch, 82 is a shift device, 83 is a selector, 84 is a register, 85 is a code length detection unit, 86 is a FRAM, 87 is a coding output unit, 89 is a decoding input unit, and 89 is a control unit.

First the recording operation in this embodiment is explained. In recording, the input of the shift device 76 is set at the output of the variable length coding unit 73 by the switch 75. The input of the selector 78 is set at the output of the shift device 76 and register 79 by the switch 77. By thus setting the switch 75 and switch 77, the apparatus in FIG. 10 may be matched with the recording apparatus in FIG. 8. In this way, by using two switches, the recording apparatus is realized in this embodiment.

The reproducing operation in this embodiment is explained successively. In reproducing, the input of the shift device 76 is set at the output of the register 79 by the switch 75. The input of the selector 78 is set at the output of the VRAM 80 and register 79 by the switch 77. Furthermore, the output of the shift device 76 is connected to the variable length decoding unit 73, and the output of the register 84 is connected to the input of the VRAM 80. By thus setting the switch 75 and switch 77, the apparatus in FIG. 10 may be matched with the reproducing apparatus in FIG. 9 by using two switches, the reproducing apparatus is realized in this embodiment.

In this embodiment, therefore, the recording/reproducing apparatus may be realized in an almost same circuit scale of recording apparatus or reproducing apparatus. Hence, the circuit scale may be reduced significantly as compared with the conventional case of installing the recording apparatus and reproducing apparatus independently.

In the foregoing three embodiments, the constitutions of the recording apparatus, reproducing apparatus, and recording/reproducing apparatus of the invention have been described herein. The number of bits of the registers 46, 65 and 79 in the above embodiments is enough at $16 \times 2 = 32$ bits, while the registers 51, 61 and 84 may be realized sufficiently at $16 \times 3 - 1 = 47$ bits.

In the illustrated embodiments, the maximum code length of all variable length codes is 16 bits, but the invention may be similarly applied to variable length codes having other arbitrary maximum code lengths. Likewise, it may be also applied to other formats than the format in FIG. 32 (b), or to an arbitrary number of small blocks. In the actual circuit composition, various constitutions than those mentioned hereabove may be possible.

Being thus composed, in the recording apparatus of the invention, by using two memories, VRAM and FRAM, variable length coding and formatting are executed in a pipeline system. As a result, complicated formatting may be applied also to high speed input signals such as moving picture signals. In the reproducing apparatus of the invention, incidentally the, same as in the recording apparatus, by using VRAM and FRAM, deformatting and variable length decoding may be realized at high speed. Finally, the recording apparatus and reproducing apparatus of the invention share many similar points in the circuit composition, and accordingly by changing over the processing sequence by means of switches when recording and reproducing, almost all circuits can be shared, so that the circuit scale may be effectively reduced.

A more specific constitution of a compression apparatus is explained by reference to a block diagram in FIG. 11. In the diagram, numeral 100 denotes a small block forming unit, 101 is a large block forming unit, 102 is a orthogonal transforming device, 103 is a quantizing unit, 104 is a variable length coding unit, 106 is a register, 108, 112, 118 are RAMs, 116 is a data control unit, 121 is a transmission unit, and 105, 107, 110, 111, 114, 115, 117, 120 are switches.

Figure 12:
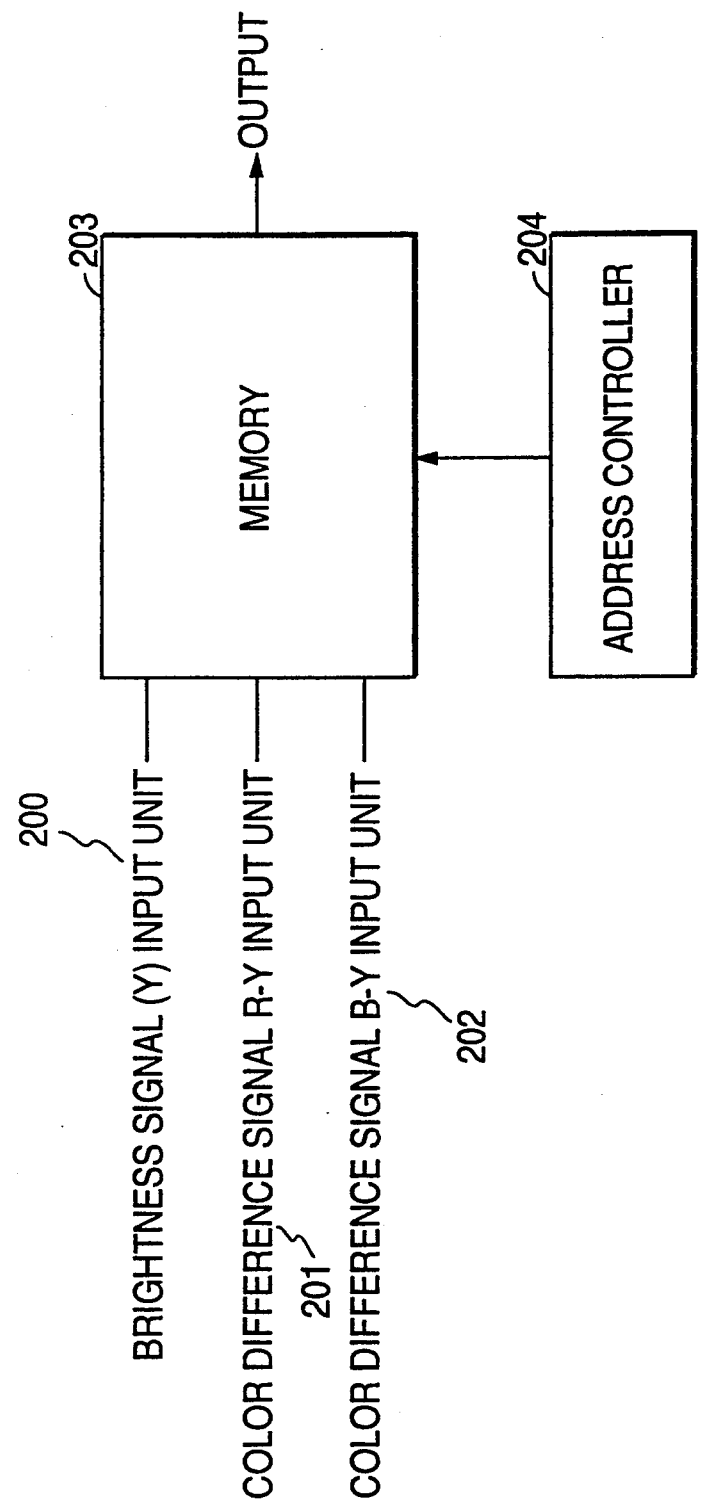
FIG. 12 is a structural diagram of a large block forming unit.

The small block forming unit 100 divides the video signals in the unit of 1 frame being entered into small blocks (these small blocks are the minimum units of subsequent signal processing) consisting of sample values in a total of 64 pixels of horizontal 8 pixels by vertical 8 pixels. The small blocks are assembled into one large block (one video segment) in a group of every 30 small blocks in the large block forming unit 101. FIG. 12 is a structural diagram of the large block forming unit, in which 122 is a brightness (Y) signal input unit, 123 is a color difference signal R−Y (CR) input unit, 124 is a color difference signal B−Y (CB) input unit, 125 is a frame memory, and 126 is an address controller. The sample values of small blocks supplied from the brightness (Y) signal input unit 122, color difference signal R−Y (CR) input unit 123, and color difference signal B−Y (CB) input unit 124 are once accumulated in the frame memory 112, and put into the orthogonal transforming device 102 in every large block of 30 small blocks according to the address controller 126, in the sequence of Y to Y to CR to Y to Y to CB to Y to Y to CR to Y to Y to CB to ... to Y to Y to CB.

In FIG. 13, the block indicated by shaded area denotes a small block, and by shuffling and collecting 30 small blocks at various positions on the screen, one large block (hereinafter this unit is called a video segment) is composed. By thus shuffling, the quantity of information on the screen is dispersed, and the quantity of information included in each video segment is hence nearly equal. Therefore, if the quantity of information is biased depending on the locations on the screen, it is possible to compressed efficiently.

The orthogonal transforming device 102 orthogonally transforms the input small blocks of sample values in each unit two-dimensionally by the DCT. In this orthogonal transforming device 102, first the DCT is performed in the horizontal direction of small blocks, and then the orthogonal components undergoing DCT in the horizontal direction are reshuffled in the vertical direction in a horizontal and vertical reshuffling part (not shown) built in the orthogonal transforming device 102, and are subjected to DCT in the vertical direction. The frequency components thus subjected to DCT are reshuffled and arranged from the lowest frequency components in FIG. 14. In FIG. 14, the upper left corner denotes the orthogonal components corresponding to the lowest frequency both horizontally and vertically, and the right side refers to the orthogonal components expressing the higher frequency in the horizontal direction, and the left side shows the orthogonal components of the lower frequency. Here, the direct current (DC) components are disposed at number 1.

The orthogonal components of every small block (DCT block) thus undergoing two-dimensional DCT is output in the video segment unit into the quantizing device 103 in the numerical order in FIG. 14 from the orthogonal components expressing the low frequency range in both horizontal direction and vertical direction.

FIG. 15 shows the output sequence of the DCT blocks, in which the orthogonal transforming device 102 processes in the sequence of input from the large block forming unit, and hence the outputs are produced in the sequence of the DCT block, that is, Y to Y to CR to Y to Y to CB and so forth (hereinafter, as shown in the drawing, DCT No. 0 to DCT No. 14 are called the first half 15 DCT blocks, and DCT No. 15 to DCT No. 29, second half 15 DCT blocks).

The orthogonal components put in the quantizing device 103 are quantized except for the DC components (hereinafter the other orthogonal components than DC components are called AC components). This quantizing refers to the operation for rounding the values of the orthogonal components in order to control the data quantity after coding. The quantized data of AC components quantized in the numerical order of the DCT blocks are delivered to the variable length coding device 104 for coding at high efficiency. In the variable length coding device 104, according to the two-dimensional Huffman code or other algorithm, the data is transformed into the code word data of variable length on the basis of the 0 run length and amplitude value of the quantized data other than the DC components. Here, the maximum length of the code word data is 16 bits, which is assigned to the code word data of a relatively large amplitude of a very small probability of occurrence, and the maximum code length expressing the 0 run length is 15 bits.

The data coded in the variable length coding device 104 is formatted according to the rule explained below into three sync blocks (syncblock0, syncblock 1, syncblock2) shown in FIG. 16, and is combined with error correction code, ID and other information signals by the transmission unit 123, and modulated by a modulation unit (not shown) and recorded in a tape.

Figure 17A:
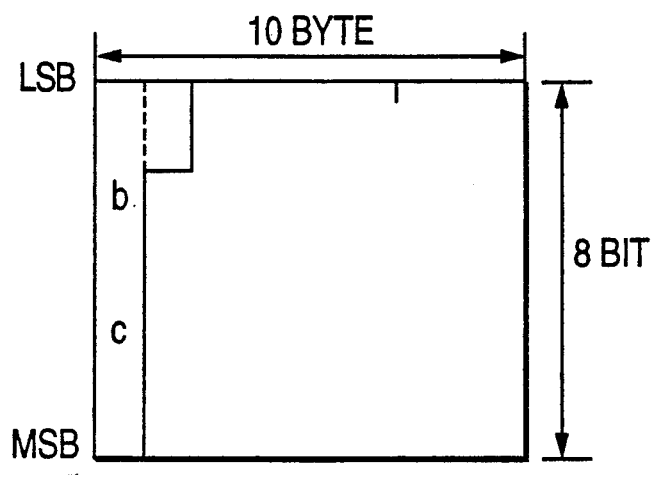
FIG. 17 is a structural diagram of a fixed block in a sync block.
Figure 17B:
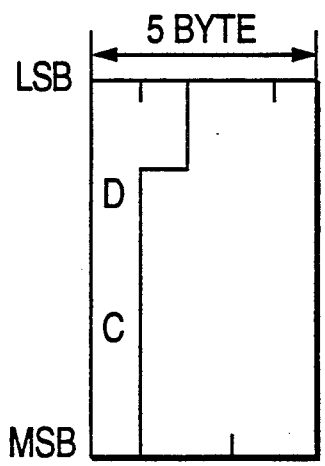
Figure 18:
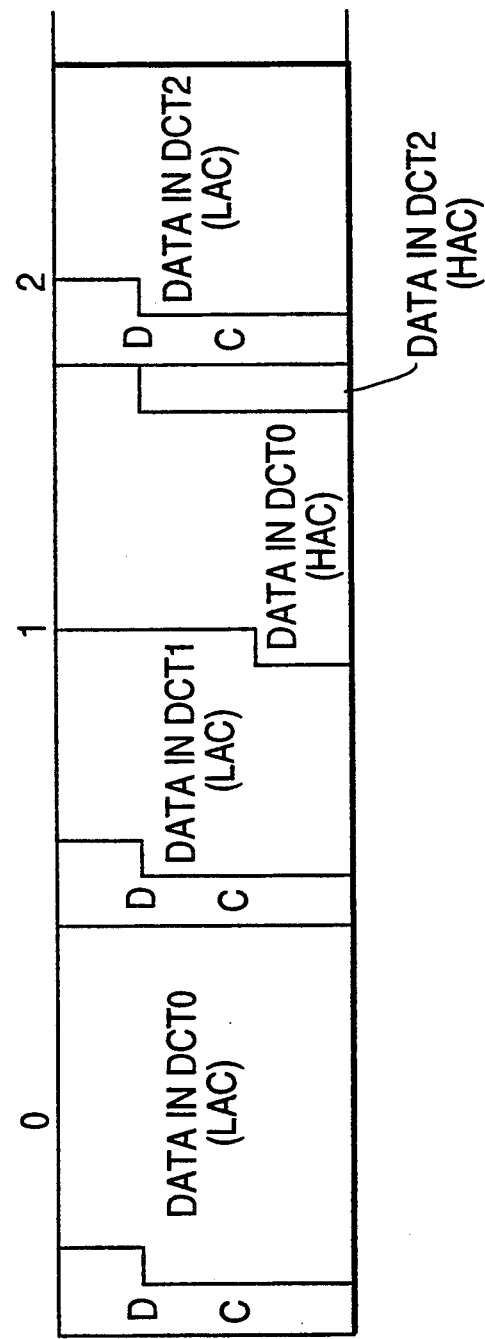
FIG. 18 is a schematic diagram showing an example of arrangement of data in sync blocks.

Formatting of variable length code into sync block is explained. Three sync blocks have a data width of 8 bits as shown in FIG. 16, and syncblock 0 and syncblock1 consist of ten fixed blocks (regions) of 10 bytes, and five fixed blocks (regions) of 5 bytes, and syncblock 2 comprises a free region of 125 bytes. The code word data of variable length coded by the variable length coding device 104 is divided into three sync blocks (syncblock0, syncblock1, syncblock2) in FIG. 16 and written. The fixed blocks of syncblock0 and syncblock1 are numbered as shown in FIG. 16, that is, the fixed blocks 0, 1, 3, 4, 6, 7, 9, 10, 12, 13, 15, 16, 18, 19, 21, 22, 24, 25, 27, and 28 are 10-byte fixed blocks, and blocks 2, 5, 6, 11, 14, 17, 20, 23, 26, and 29 are 5-byte fixed blocks. In these fixed blocks, the code word data of the DCT blocks corresponding to the numbers are written by priority, and it is also formatted that the code word data of the first half 15 DCT blocks are written by priority in syncblock0 (fixed blocks 0 to 14), and code word data of the second half 15 DCT blocks in syncblock1 (fixed blocks 15 to 29). FIG. 17 is the configuration showing each fixed block, in which (a) denotes the 10-byte block and (b) represents the 5-byte block, and the data (10 bytes in this embodiment) of the DC component of the DCT block corresponding to the number is written at each beginning, being followed by the code word data of the AC components in the sequence of the least significant bit (LSB). FIG. 18 shows the mode of writing of code word data in sync blocks, and in this example the code word data quantity of AC components is 90 bits or more (overflowing from fixed block 0) in DCT0, within 70 bits in DCT1, and 40 bits or more (overflowing from fixed block 2) in DCT2. In the first place, the DC component data of DCT0 is written in block 0, and the code word data of AC components of DCT0 is written in sequentially in succession. At this time, when the region of the fixed block 0 is filled up, writing of DCT0 data is temporarily stopped, and then data of DCT1 is written into fixed block 1. When all of code word data of DCT1 is written in and if there is a vacant area in fixed block 1, this vacant area is skipped, and the next DCT2 data is written in from the beginning of the fixed block 2. In this way, all fixed blocks are first filled up with the code word data of DCT blocks corresponding to the numbers. In the next step, since the data of DCT0 is not fully written in, the remaining code word data is written into the vacant area of the fixed block 1. When all data of DCT0 is written in, the data of DCT2 of which code word data is not fully written is processed. As shown in FIG. 8, if there is a vacant area in the fixed block 1, the remaining code word data is written in this space, and when the region of the fixed block 1 is filled up, the remaining code word data is written into a vacant area in the next empty fixed block. By repeating this action, the data of the DCT blocks are written into sync blocks (in the numerical sequence of DCT, data is sequentially written into the empty area of the smaller fixed block numbers). As mentioned above, after priority writing of data of the first half 15 DCT blocks in syncblock0 and data of the second half 15 DCT blocks in syncblock1, if there are still code word data not written yet, the remaining code word data is written in the empty area, if any, of the syncblock0 or syncblock1, or if there is no empty space in syncblock0, syncblock1, the data is written into syncblock2. In syncblock2, however, the data of the first half 15 DCT blocks are written by priority. In syncblock2, different from syncblock0, syncblock1, it is prohibited to mix code word data of different DCT blocks in the region of 1 byte. As shown in FIG. 18, the code word data of the DCT block of the same number as the fixed block number is called the low range data (LAC), and the code word data written in syncblock 2 and other number data are called high range data (HAC).

Thus, when formatting the code word data of variable length coding (LVC hereinafter), it is difficult in timing to format by writing and processing into fixed blocks by dividing into LAC and HAC in every code word data produced one after another from the variable length coding device 104, or processing by priority writing of data of first half/second half 15 DCT blocks into respective sync blocks, and therefore the output of the variable length coding device 104 is once stored in a buffer RAM, and the code word data is shuffled.

Figure 11:
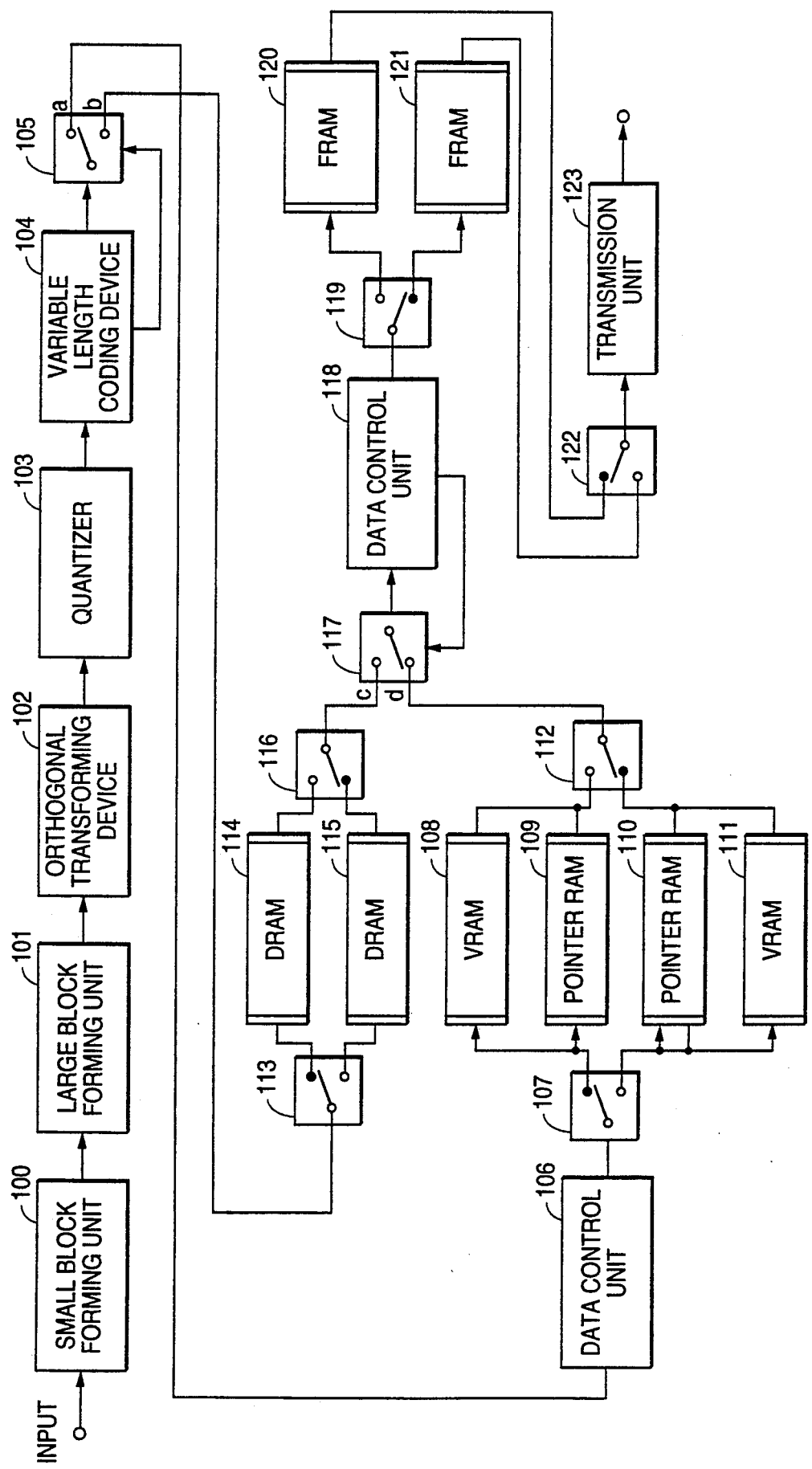
FIG. 11 is a block diagram of a recording apparatus in an embodiment of the invention.

The buffer RAMs include, in FIG. 11, DRAM 114, 115, VRAM 108, 111, FRAM 120, 121. More specifically, DRAM 114, 115 are the RAMs for storing the data of DC components, VRAM 108, 111 are the RAMs for storing the VLC-ed data, and FRAM 120, 121 are the RAMs for temporarily storing the formatted data. These RAMs are prepared in pairs, so that one is used in writing mode while the other is used in reading mode (which is, so to speak, the ping-pong structure). This reading/writing action is changed over by the switches 113, 116, 107, 112, 119, 122, and this changeover is effected in every unit of 1 video segment. These operations are described below. It is supposed, in the following explanations, that the switches 113, 116, 107, 112, 119 and 122 are selected at the black-spot side contacts.

Figure 19A:
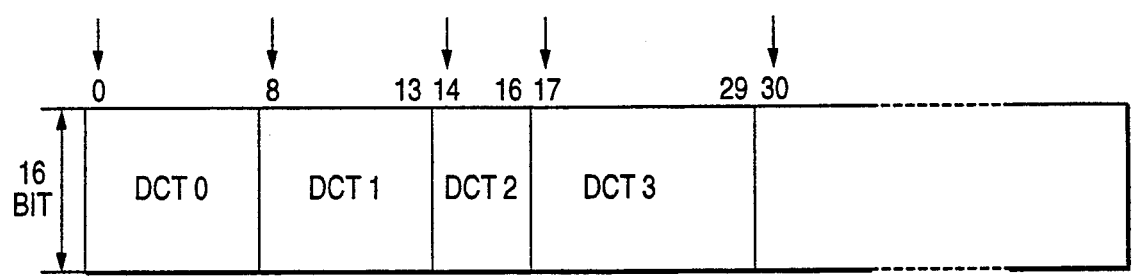
FIG. 19 is a structural diagram of a VRAM of the invention.
Figure 19B:
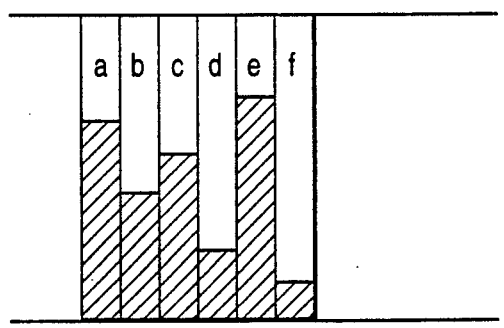

In each DCT block, first the DC component is produced from the variable length coding device 104. At this time, the switch 105 is selected at the b side by the command from the variable length coding device 104, and the DC component is written into the DRAM 115 through the switch 113. The variable length coding device 104, after producing the DC component, changes over the switch 105 to the contact a side, and delivers the data of AC component into the data control unit 106. The data control unit 106 writes, through the switch 107, the data of one code word in every address (1 word = 16 bits) in the VRAM 108 as shown in FIG. 19 (b), and detects the eob (end of block) code which is the code word data indicating the end of each DCT block, then stores the next address value of writing the eob code into the pointer RAM 109 as the head address of the next DCT block. When the data of DCT blocks are written in as shown in FIG. 19 (a), the values of 0, 8, 14, 17, 30, and so forth are sequentially stored in the pointer RAM. The bit width of 1 word of VRAM depends on the bit length of the code word data, and in the conventional apparatus, since the maximum bit length of code word is 16 bits, one word of VRAM 108, 111 is 16 bits wide.

While writing the data from the variable length coding device 104 into the DRAM 114 or VRAM 108 in this way, the DRAM 116 and VRAM 111 are in reading mode, and from these RAMs the data written in the period one video segment before are read out by the control of the data control unit 118. The data control unit 118, when processing the data of DCT blocks, first connects the switch 116 to the c side, and writes the DC component read out from the DRAM 115 into the beginning portion of the fixed block of the FRAM 121 as shown in FIG. 18. Next, the data control unit 118 connects the switch 117 to the d side, and writes the data of AC component written in the VRAM 111 into the FRAM 121 by filling sequentially according to the above rule sequentially from the beginning of the DCT block on the basis of the value of the pointer RAM 110.

At this time, the FRAM 120 is in read mode, and the data is sent out to the transmission unit 123 sequentially from the head address through the switch 122.

When the data processing time of one video segment is over, the switches 107, 112, 113, 116, 119, 122 are changed over to the opposite contact (while spot) side, and the mode of the corresponding RAMs is changed over, and the same operation as above is repeated.

Figure 20:
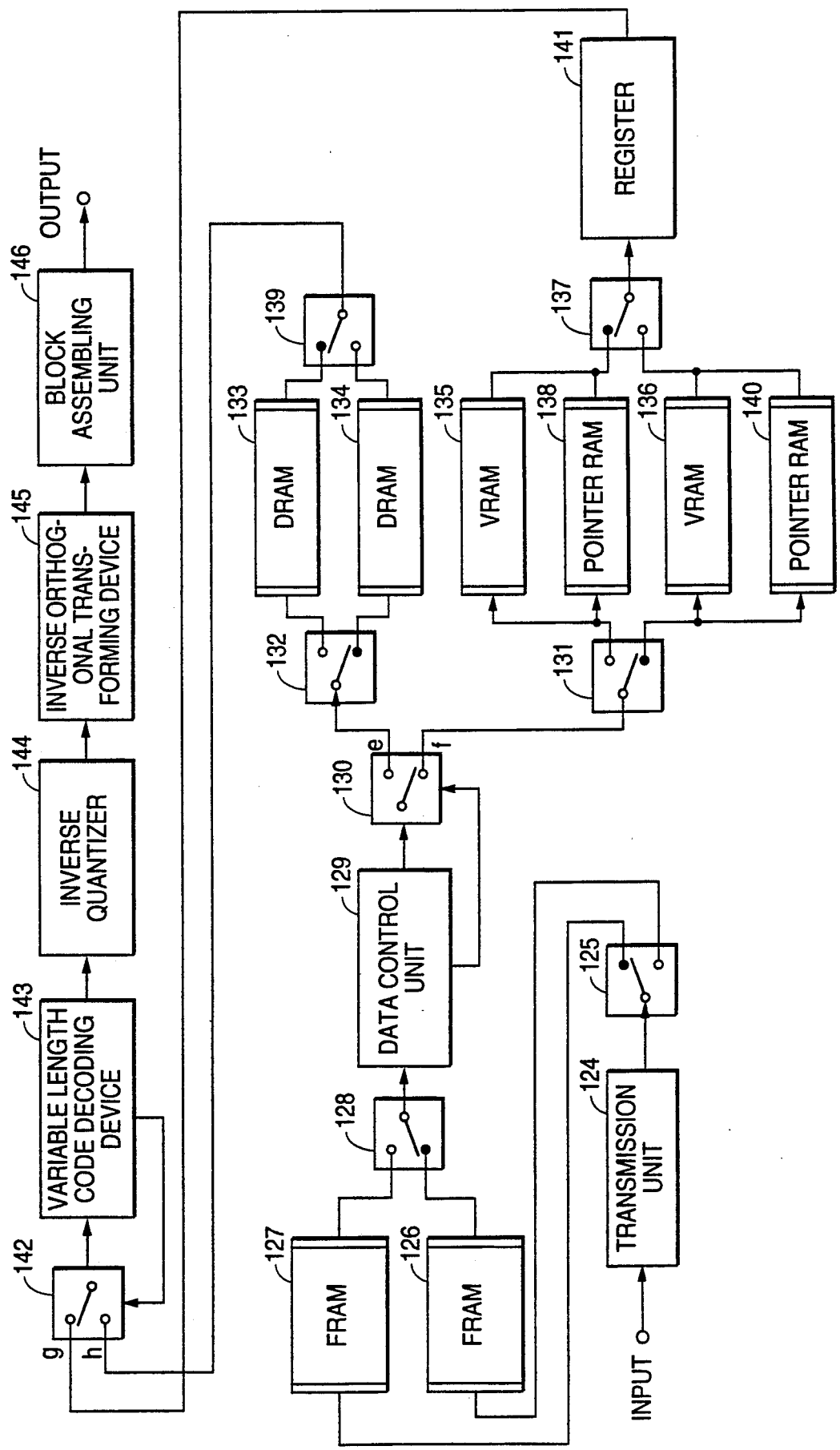
FIG. 20 is a block diagram of an embodiment of a reproducing apparatus of the invention.

Next is explained the case of reproducing the data strings recorded on a tape by the above recording apparatus. FIG. 20 is a block diagram of a reproducing apparatus. The flow of data in reproduction is reverse to that of recording, and the composition of each RAM is in ping-pong structure the same as in the recording apparatus. The switches, 125, 128, 131, 132, 137, 139 are changed over in the unit of one video segment period, and each RAM is changed over in write/read mode. It is supposed in the following explanations that the switches are selected at the black-spot contact side. The data demodulated through the reproducing amplifier and demodulator, not shown the same as in the recording apparatus, is supplied into the transmission unit 124. In the transmission unit 124, removing the information such as index added after error correction, the data concerning the image (variable length code) is written into FRAM 127 through switch 125. The data control unit 129 reads out the data written in the period one video segment before from the FRAM 126 through the switch 128. When processing the data of each DCT, the data control unit 129 first changes over the switch 130 to the e side, writes the DC component into the DRAM 134, then changes over the switch 130 to the f side, cuts out the data of AC component filling up the FRAM 126 in the unit of code word, and writes the one-code word data into the VRAM 136 in every address as shown in FIG. 19 (b). At the same time, the address of the VRAM 136 for writing the beginning data of DCT block is written into the pointer RAM. The variable length code decoding device 143 changes over the contact of the switch 142 to the h side, and reads out the DC component of the DCT block for the next decoding processing from the DRAM 133, and changes over the switch 142 to the g side, and reads out the data of the AC component written in the period of one video segment before sequentially from the address of the VRAM indicated by the pointer RAM 138 through the register 141, thereby decoding into the zero run length and amplitude value, and produces to the inverse quantizer 144 sequentially from the DC component. The inverse quantizer 144 inversely quantizes the decoded data, and produces the inversely quantized data into the inverse orthogonal transforming device 145. The inverse orthogonal transforming device 145 inversely performs DCT on the input inverse quantized data, transforms from the data in the frequency region into the data in the time region, and produces into a block assembling unit 146. In the block assembling unit 146, the data of every input block is inversely shuffled, while the scattered image data is reassembled into the data of the original one frame portion, and is sent out into the D/A converter (not shown), and converted into an analog video signal, which is sent out into the monitor television or the like.

In such an apparatus, it is when all values after quantization of orthogonal components excluding DC components (that is, AC components) are other than zero (the zero run is zero and all quantized data are other than zero) that the number of code words per 1 DCT block reaches the maximum, and at this time there are a number of code words having the eob code (the code indicating the end of 1 DCT block) added to the number of AC components. If there are 63 AC components in 1 DCT block as shown in FIG. 14, the maximum number of code words including the eob code is 64.

In this apparatus, meanwhile, in writing data into the VRAM, since the data of one code word is assigned to one address, and the data is sequentially written in from the head address of the VRAM sequentially from the DCT block 0, the memory capacity of one VRAM is required as follows, seeing that there are 30 DCT blocks in the video segment as the processing unit:

$64 \times 30 \times 16 = 30720$ bits.

This value of memory capacity is more than 10 times the data quantity being actually recorded of 2700 bits (in this apparatus, $125 \times 8 \times 3 - 10 \times 30 = 2700$).

Figure 21:
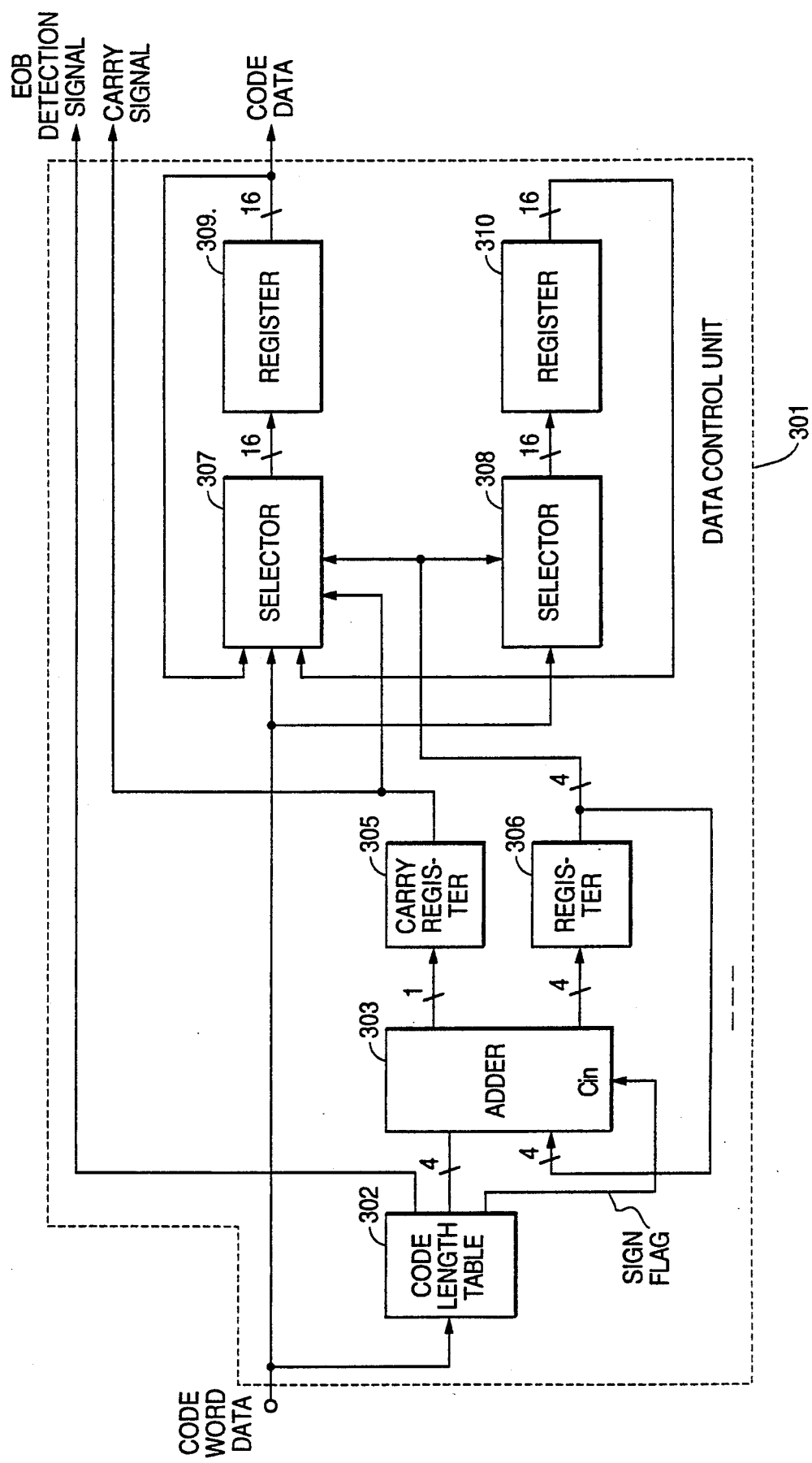
FIG. 21 is a block diagram showing a data control unit of a recording apparatus in an embodiment of the invention.
Figure 23:
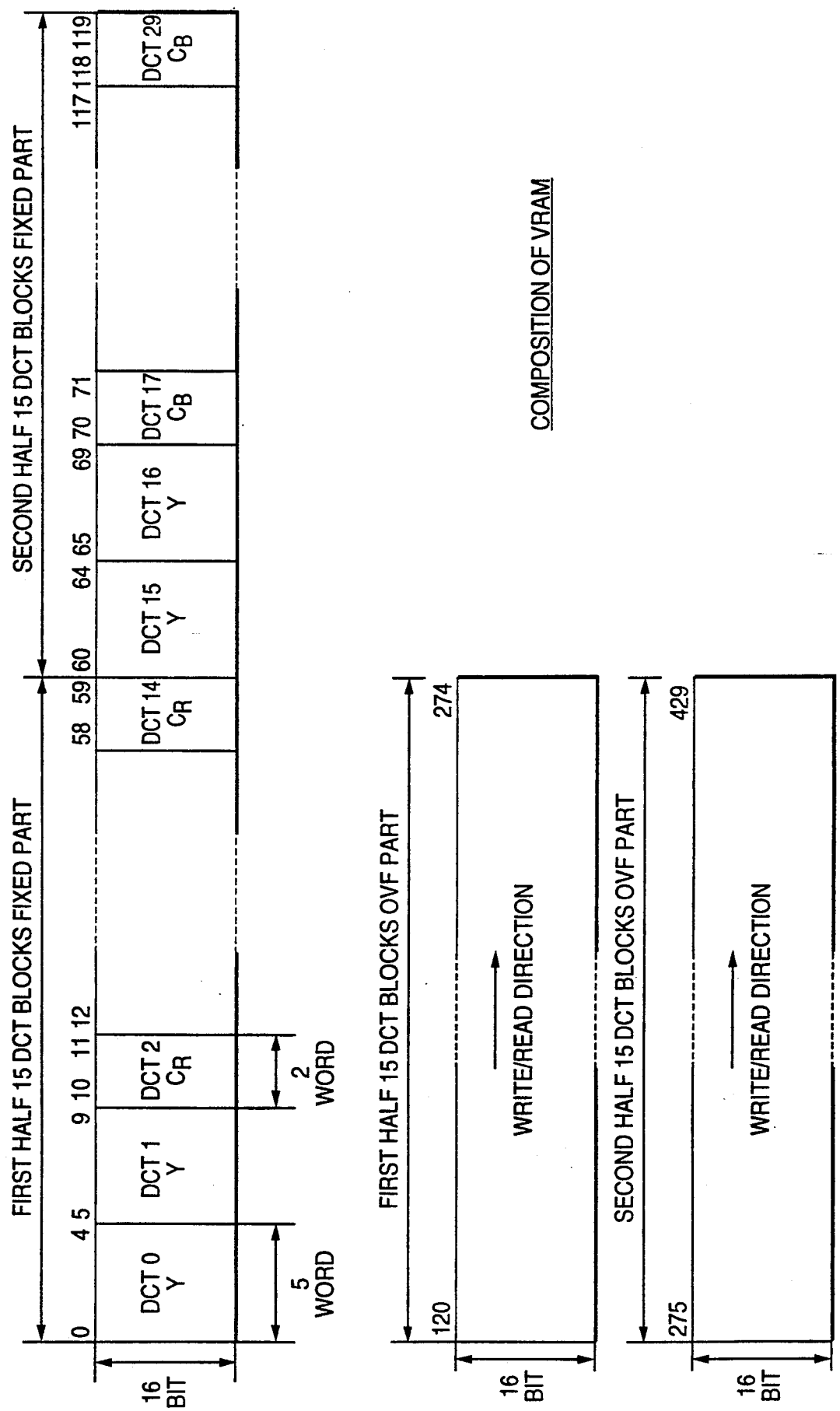
FIG. 23 is a structural diagram showing the constitution of a VRAM in an embodiment of the same apparatus.
Figure 24:
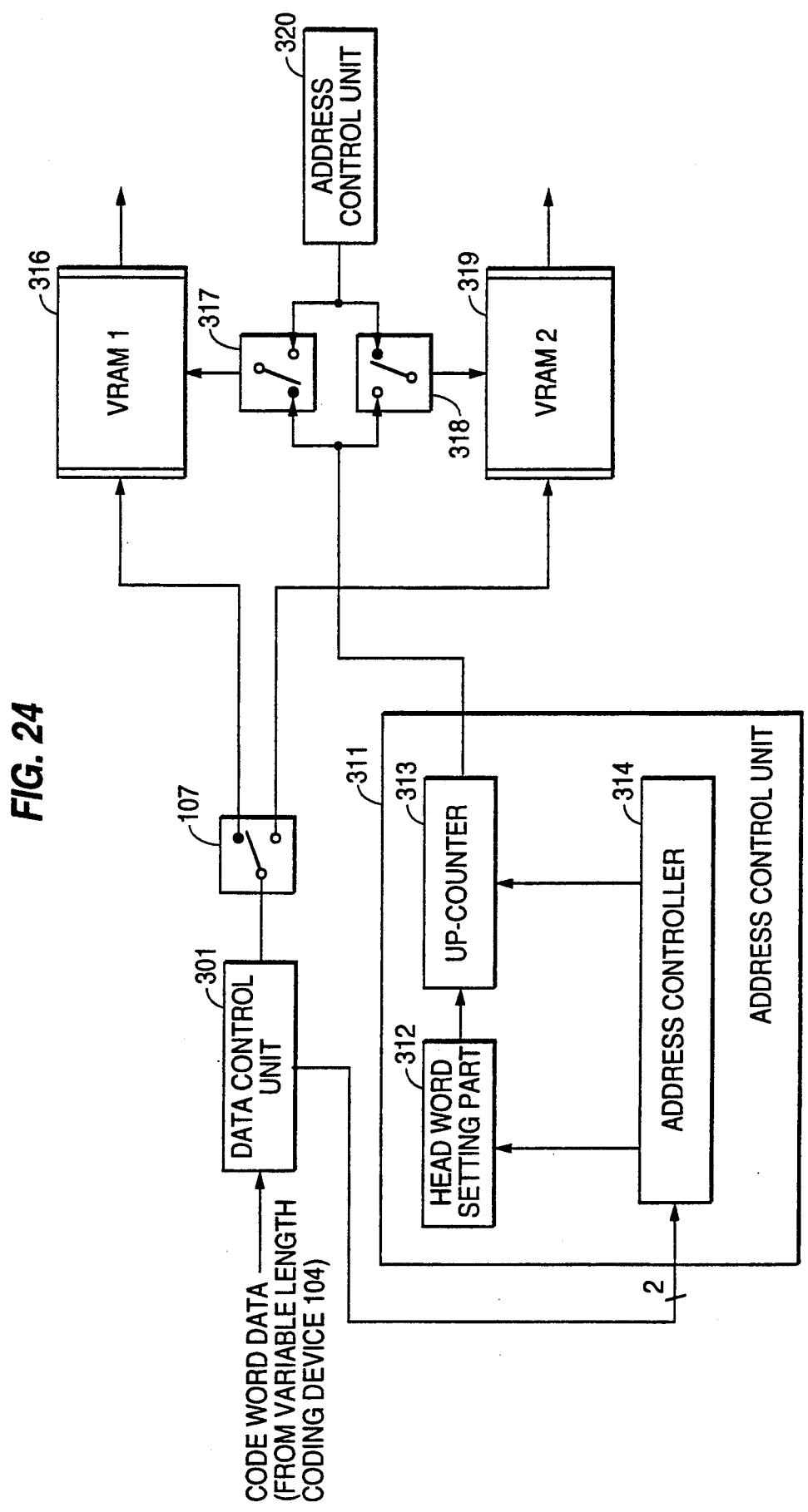
FIG. 24 is a block diagram of a control unit for controlling the VRAM in an embodiment of the same apparatus.
Figure 25A:
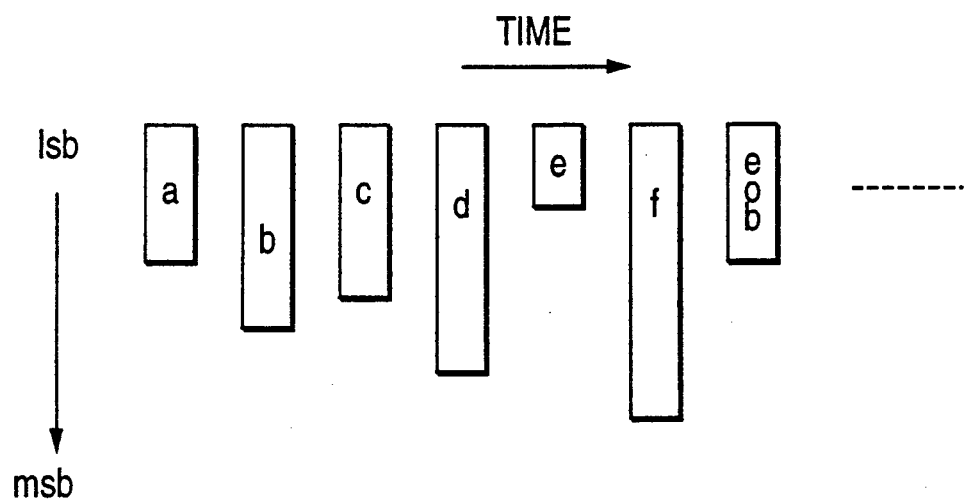
FIG. 25 is a relational diagram showing the input code word data and the position written in the VRAM.
Figure 25B:
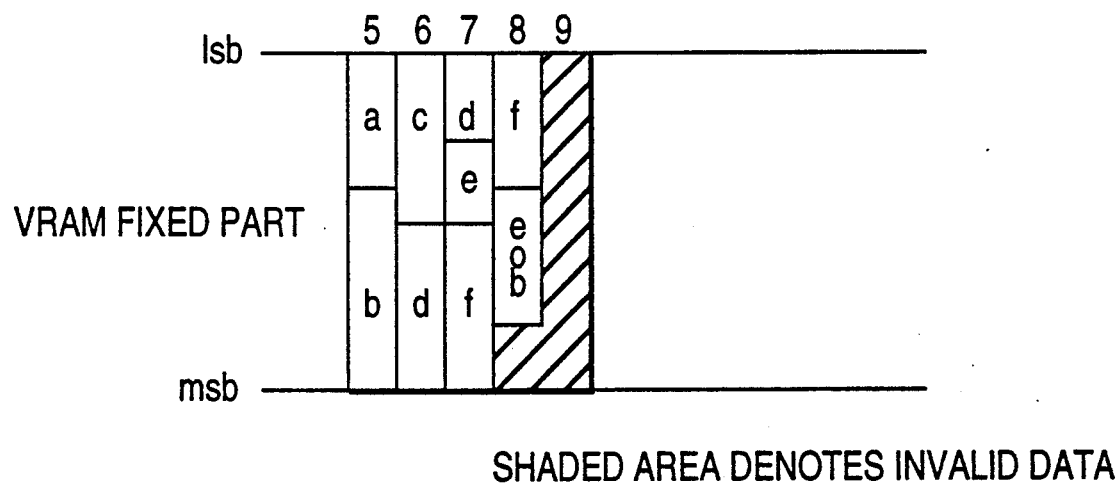

Accordingly, an embodiment for reducing the memory capacity of the VRAM is explained below. FIG. 21 is a block diagram showing the data control unit of the recording apparatus of the invention. In the apparatus of this embodiment, the blocks acting the same as in the foregoing apparatus are identified with the same reference numbers as in FIG. 11 and FIG. 20, and their explanations are omitted. In FIG. 21, numeral 302 is a code length table for detecting presence or absence of code length and eob code of the code word data entering a data control unit 301, and also sign bit of the code word, 303 is a 4-bit adder for cumulatively adding the code length of the input code word data, together with a register 306, 305 is a carry register for latching the carry output of the adder 303, 306 is a register for latching the addition result of the adder 303, 307 is a selector for selecting the 16-bit data from the output data of the code word data 309, register 130 entered by the output value of the carry register 305, register 306, 308 is a register for selecting a part of the code word data by the output value of the selector 307, and 309, 310 are registers for latching the outputs of the selectors 307, 308, respectively. FIG. 22 is a status diagram showing the shuffling mode of the code word data at every time, FIG. 23 is a structural diagram showing the constitution of the VRAM in this embodiment, and FIG. 24 is a block diagram of the VRAM control unit of the recording apparatus in the embodiment, in which 312 is a head value setting part for setting the head value of address, 313 is an up-counter for counting up the address from the value set in the head value setting part 312, and 314 is an address controller for controlling their actions. An address control unit 311 is composed of the head value setting part 312, up-counter 313, and address controller 314. FIG. 25 is a relation diagram showing the input code word data and the position written in the VRAM. Referring to these drawings, the operation of this embodiment of the invention is described below.

Suppose the data of a certain DCT block is sent out from the variable length coding device 104 in FIG. 11 sequentially from the DC component. The data of this DCT block is composed of the DC components and six code words as shown in FIG. 22, *a, b, c, d, e, f,* that is:

a is a 6-bit signed code word (code length 5, sign flag 1), b is a 10-bit unsigned code word (code length 10, sign flag 0), c is an 8-bit signed code word (code length 7, sign flag 1), d is a 12-bit signed code word (code length 11, sign flag 1), e is a 4-bit unsigned code word (code length 4, sign flag 0), and f is a 14-bit signed code word (code length 13, sign flag 1), and eob is a 6-bit unsigned code word.

After the DC component is output and written into the DRAM 114, when the first 6-bit code word data a is entered at time to from the variable length coding device 104 as shown in FIG. 22, the code length table 302 sends out the code length 5 to one addition terminal of the adder 303, and the sign flag 1 to the carry-in (Cin) terminal of the adder 303. The output of the register 306 is added to the other addition terminal of the adder 303, and at time to when the first code word of the DCT block is entered, the initial value 15 is set. Therefore, in the adder 303, at time to, the addition of 5+15+1=21 is performed, and the result is sent to the carry register 305 and register 306. That is, the output value of the carry register 305 at time t1 is 1, and the output value of the register 306 is 5.

The selectors 307, 308 operate, when numbered from 1sb of the register 309 to each bit position as shown in FIG. 22 by assembling the register 309 and register 310 into one, so that the code word data may be latched in the registers 309, 310 (the 1sb of the code word data enters at the position of output value +1 of the register 306) from the position of output value +1 of the register 306 toward the higher bit (MSB side), and that the output of the same bit position of the register 309 may be fed back to the lower bit position of the register 309 (the LSB side from the value indicated by the output of the register 306), when the output of the carry register 305 is 0, or that the output of the same bit position of the register 310 may be latched when the output of the carry register 305 is 1.

Therefore, when the code word data a, b, c . . . are supplied into the data control unit 301, as shown in FIG. 22, at time to, since the value of the register 306 is 15 and the value of the carry register 305 is 0, the code word data a is entered from the position of bit 16 of the register 310 to the higher position, and is latched in the register 310 at time t1.

At time t1, since the value of the register 306 is 5 and the value of the carry register 305 is 1, at the lower side of the position of bit 5 of the register 309 the data of the lower side from the position of bit 5 of the register 130, that is, the code word data is entered, and the code word data b is entered at the upper side from the position of bit 6 of the register 309, and latched in the register 309 at time t2.

At time t2, from the result of addition (10+5=15) in the adder 303 at time t1, since the value of the register 306 is 15 and the value of the carry register 305 is 0, the feedback value of the register 309 is entered at the lower side from the position of bit 15 of the register 309, and the code word data c is entered at the upper side from the position of bit 16 of the register 310, and latched in the registered 309, 310 at time t3.

In the data control unit 301, this operation is repeated according to the same rule every time the code word data is entered, and the code word data is filled up in every 16 bits by using the registers 309, 310 as shown in FIG. 22, and when the output of the carry register 305 becomes 1, as understood from FIG. 22, the register 309 indicates that all 16 bits are filled up with the code word data, and this signal is used to control the updating of the addresses of the VRAM 316, 317 as mentioned later. At time t1, although the register 309 is not filled up completely with code word data, the output of the carry register 305 becomes 1, which shows that the processing has been transferred to the new DCT block, and it may be also used as the signal for updating the addresses. (Hereinafter the output of the register 309 is called the code data.)

Thus, in this embodiment, by filling the code word data in 16-bit unit and writing into the VRAM, as compared with the conventional case of writing data of one code word in every address, it is not necessary to assign the code word data of, for example, 3 bits with an area of 16 bits, and therefore the minimum required quantity of the VRAM is considered in the bit unit, not in the unit of number of code words, so that the capacity of the VRAM may be reduced greatly, which brings about an outstanding effect.

The constitution of the VRAM of the apparatus in this embodiment is explained. As shown in FIG. 23, a fixed region for writing code data of only a specific DCT block is provided in each DCT block, and the DCT block corresponding to Y signal is assigned with 5 words, and the DCT block corresponding to color difference signals CR, CB, with 2 words. By thus disposing fixed area for each DCT block, the head address of the DCT block may be easily known without pointer RAM when moving the code data to the FRAM 120, 121 in FIG. 11, and also the VRAM may be reduced while maintaining the data (LAC) in the low range portion of each DCT block. This is because the code data of the DCT block of the same number as the individual fixed block number is given priority in writing of code data into the sync block, but as for the code data not written therein the data of the DCT block of smaller number is written in the HAC part by priority in both first half 15 DCT blocks and second half DCT blocks, and when overflowing the data quantity permitted (recorded) in three sync blocks (in this embodiment, 2700 bits excluding DC component), the subsequent code data is discarded. Therefore, as in this embodiment, after keeping the data (LAC) quantity to be written into the fixed blocks of the DCT blocks, by setting the capacity of the overflow (OVF) part mentioned below in considering in how many bits at maximum the code data not written in the fixed region may exceed the allowable data quantity, the capacity of the VRAM may be reduced notably as compared with the prior art. Incidentally, the quantity of the code data (including the DC component) to be written into the fixed blocks is set in this embodiment at 5 words (80 bits) and 2 words (32 bits) for the fixed part considering from the above reason, seeing that the DCT block corresponding to Y signal is 70 bits and that CR, CB signals are 30 bits. Here, the maximum code length of code word is 16 bits, and in order to process, such as detection of code length, in one specific time (clock) so as to raise the processing speed, the data processing unit is set at 16 bits. Hence, 1 word of VRAM is 16 bits.

The code data exceeding the fixed part is written into the OVF part provided as shown in FIG. 23, sequentially from the smaller DCT block numbers, together with the code data of each DCT block. The OVF part is composed of a portion for writing code data of the first half 15 DCT blocks, and the portion for writing the data of the second half 15 DCT blocks. That is, each head address is determined. The OVF part is thus divided into the first half 15 DCT blocks and second half 15 DCT blocks in order to easily know the head address when writing the data of the first half 15 DCT/second half 15 DCT by priority into syncblock0, 1 as mentioned above.

The number of words required in the OVF part is explained below. Owing to the three conditions, (1) Only the data of one DCT blocks is written in the fixed part of the VRAM, (2) the capacity of the fixed part of each DCT block of VRAM is smaller in the capacity of color difference signals CR, CB, as compared with Y signal, and (3) the code data quantity excluding the already recorded DC component is 2700 bits, it is known that the pattern of the code data in the unit of one video segment using the OVF part most widely is that the data quantity of the three DCT blocks of color difference signals is very abundant, while the code data of the other 27 DCT blocks contains only the eob, and at this time the OVF part requires $$2700 - 6 \times 27 - 32 \times 3 + 15 \times 2 = 2472 \text{ bits}$$

eob: code length is 6 bits
that is, $$2472 \div 16 = 154.5$$

which means 155 words are needed. In this formula 15×2 refers to an allowance in order to avoid coexistence of code data of different DCT blocks in a same address in the OVF part (because, in a worst case, only the final code data may occupy 1 word by 1 bit alone, and also considering the case of using three DCT blocks). Two cases are considered for the color difference signals, that is, all three are present in the first half 15 DCT blocks, or in the second half 15 DCT blocks, and hence in this embodiment the OVF part is prepared by 155 words each for the first half and second half as shown in FIG. 23, and the capacity of one VRAM is, including the fixed part, 430 words (6880 bits).

Thus, according to the VRAM constitution of the embodiment, it is about 1/4.5 of 30,720 bits of the foregoing embodiment, and the capacity is reduced considerably.

In the thus composed VRAM, the writing method is explained below. The code data filled up in 16-bit unit in the data control unit 301 in FIG. 21 is sent out into the VRAM 316, 319 through the switch 107 as shown in FIG. 24, and at the same time the eob detection signal and carry signal are sent to the address control unit 311. In this embodiment, too, writing and reading in and out of the VRAM 316, 319 are of ping-pong structure, and it is supposed in the following explanation that the switches 107, 317, 318 are selected at the black-spot contacts. The address control unit 311 knows the end of processing of code data of one DCT block by the eob detection signal coming out of the data control unit 301, and the head value setting part 312 sets the up-counter 313 initially by receiving the command from the address controller 314 so that the address of the VRAM 316 may be the head address of the DCT block to be processed next when the carry signal of the next input is 1, and the address is given to the VRAM 316 through the switch 317. Afterwards, as mentioned hereabove, when the code data is filled up with 16 bits in the register 309 of the data control unit 301, the carry signal becomes 1, and therefore the output of the register 309 is written into the VRAM 316 every time the carry signal becomes 1, and the address controller 314 actuates the up-counter 313 to update the address by 1 to be ready for next writing. Therefore, for example, the code word data string of DCT block 1 as shown in FIG. 25(a) is written in from address 5 of the VRAM as shown in (b). If further code data is present and unable to write in the fixed part, the address control unit 311 controls to write the subsequent code data into the OVF part by skipping the address of the VRAM 316 to the OVF part. At this time, the VRAM 319 is in the read mode, and by the control of the address control part 320 the address is given through the switch 318, and the same as in the prior art, the data is reorganized and written into the FRAM according to the specific rule by the data control unit 118.

Thus, according to this embodiment, by the constitution in which the code word data is arranged in 16-bit unit (filled up) and the VRAM is divided into the fixed part and the OVF part, the capacity of the VRAM may be reduced remarkably, and moreover the pointer RAM for storing the head address of each DCT block is not necessary at all. In this respect, too, the circuit scale may be reduced.

Figure 26:
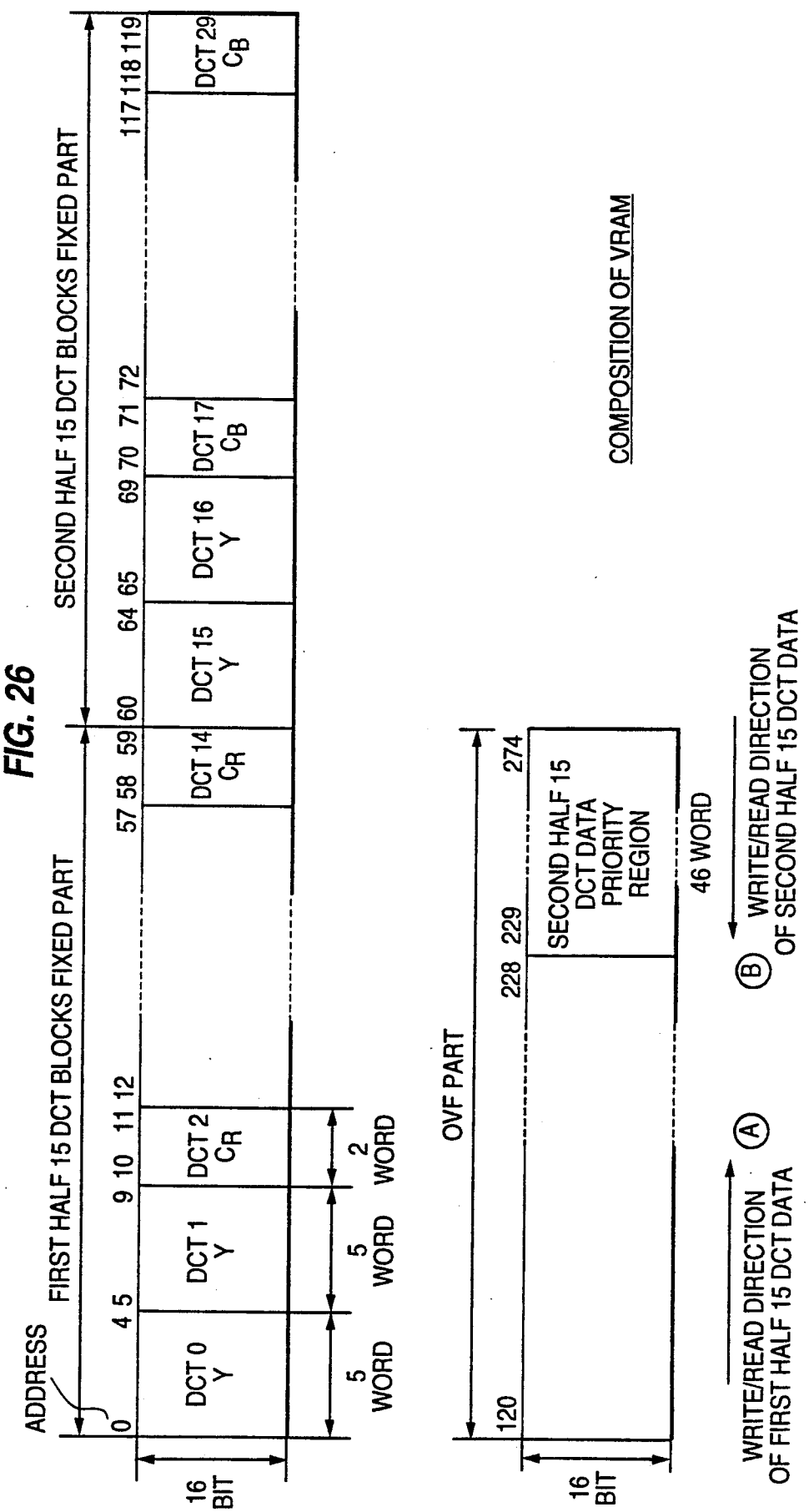
FIG. 26 is a structural diagram showing the constitution of a VRAM in an embodiment of the same apparatus.

FIG. 26 is a structural diagram showing another embodiment of the constitution of the VRAM in the apparatus. In the foregoing embodiments, in order to easily known the head address when reading out and because it is not known whether the first half or second half is greater in the data quantity, the OVF part is prepared in the first half 15 DCT blocks and the second half 15 DCT blocks, but actually the total quantity of recordable data is fixed, and the number of words in the OVF part necessary for that data quantity was, as explained earlier, 155 words. Therefore, as far as the head address of first half/second half may be known easily, and the quantity of data to be written in syncblock1 is maintained without destroying the code data of the second half 15 DCT blocks written later, it is not necessary to divide the OVF part of the VRAM into first half and second half, and only one of 155 words is enough.

Meanwhile, if the code data of the second half 15 DCT blocks are written in the whole syncblock1, the number of words corresponding to the code data of the second half 15 DCT blocks necessary in the OVF part is considered in the same concept as calculated above, and in the pattern in which much data is concentrated in the DCT block of one color difference signal while the other 14 DCT blocks have only eob code, and at this time, the OVF part requires $$850 - 6 \times 14 - 32 = 734 \text{ bits}$$

eob: code length is 6 bits
syncblock1: AC data of 850 bits can be written in that is, $$734 \div 16 = 45.875$$

which means 46 words are needed. Therefore, at least 46 words must be maintained in the priority region for writing the code data of the second half 15 DCT blocks in the OVF part.

The constitution of the VRAM shown in FIG. 26 is the same as in the first embodiment (address space) in the fixed part, but what is different from FIG. 23 is that the OVF part of the first half 15 DCT blocks and the OVF part (155 words) of the second half 15 DCT blocks are shared, and that the sequence of data write/read addresses of the first half 15 DCT blocks and the sequence of data write/read address of the second half 15 DCT blocks are reverse in the OVF part. To write code data into the thus composed VRAM, first, the code data of the first half 15 DCT blocks are written in the fixed part, and the extra code data not written in the fixed part is sequentially written in the OVF part from the address 120 in the direction of arrow A (the address increasing direction). Then, the code data not written in the fixed part of the second half 15 DCT blocks is written in the OVF part from the address 274 in the arrow B direction (the address decreasing direction), and up to address 229 writing continues by overwriting if code data of the first half 15 DCT blocks have been already written in. Thereafter, if the code data is still remaining, the code data is written in up to the address free from the code data of the first half 15 DCT blocks. The range from address 274 to address 229 is the priority region of the code data of the second half 15 DCT blocks mentioned above.

Figure 27:
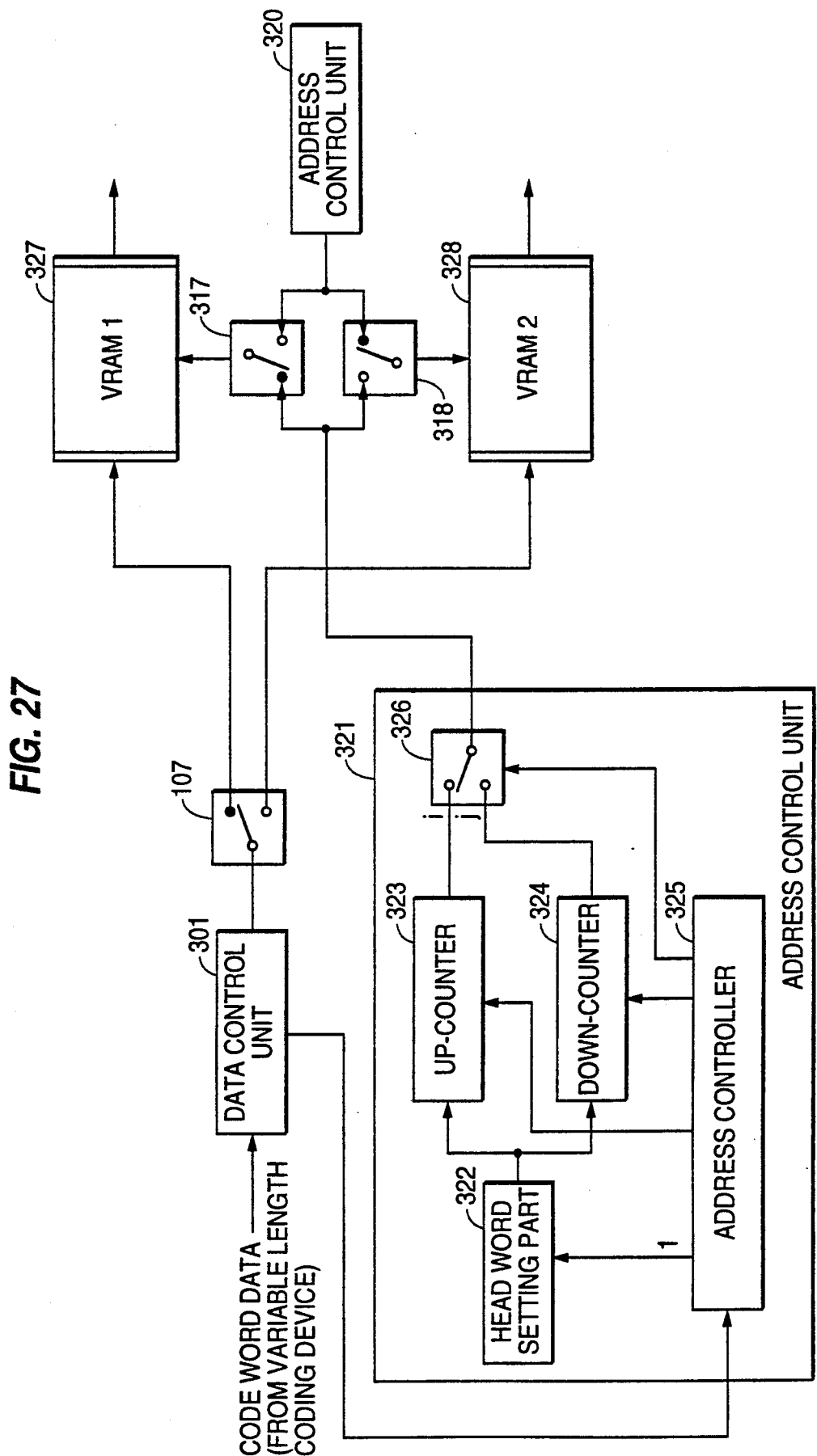
FIG. 27 is a block diagram of a control unit for controlling the VRAM in an embodiment in the same apparatus.

The method of writing into this VRAM is explained below. FIG. 27 is a block diagram of VRAM control unit of the recording apparatus using the VRAM of this embodiment, in which numeral 322 denotes a head value setting part for setting the head value of the address, 323 is an up-counter for counting up the address from the value set in the head value setting part 322, 324 is a down-counter for counting down the address from the value set by the head value setting part 322, 325 is an address controller for controlling their actions, and 326 is a switch for changing over the outputs of the up-counter 323 and down-counter 324 by the control of the address controller 325. An address control unit is composed of the head value setting part 322, up-counter 323, down-counter 324, address controller 325, and switch 326. Numerals 327, 328 are VRAMs of this embodiments.

The code data filled up in 16-bit unit in the data control unit 301 is sent out into the VRAM 327, 328 through the switch 107 as shown in FIG. 27, and at the same time the eob detection signal and carry signal are sent out to the address control unit 321. In this embodiment, too, the same as in the prior art, writing or reading into or out of VRAM 327, 328 is in the ping-pong structure, and it is supposed in the following explanation that the switches 107, 317, 318 are selected at the black-spot contacts. The address control unit 321 knows the end of processing of code data of one DCT block by the eob detection signal coming out of the data control unit 301, and the head value setting part 322 sets the up-counter 323 initially by receiving the instruction from the address controller 325 so that the address of the VRAM 327 may be the head address of the DCT block to be processed next when the carry signal of the next input is 1, and the address is given to the VRAM 327 through the switches 326, 327. The head value setting part 322 next the next address of the OVF (overflow) part while processing the data of the second half 15 DCT blocks. Afterwards, as mentioned above, when the code data is filled up with 16 bits in the register 309 of the data control unit 301, the carry signal becomes 1, and thereby by writing the output of the register 309 into the VRAM 327 every time the carry signal becomes 1, while writing the code data of the fixed part of first half 15 DCT blocks into the OVF part, the address controller 325 actuates the up-counter 323 to update the address by 1, thereby getting ready for next writing. When writing the code data of the second half 15 DCT blocks into the OVF, the address controller 325 changes over the switch 326 to the j side, and the output of the down-counter 324 is given as the address of the VRAM 327. By repeating this action, the code data is written into the fixed part and OVF part of VRAM 327, 328.

By thus using the VRAM constitution of the embodiment in this apparatus, the required capacity is only 275 words (4400 bits), and as compared with the VRAM constitution in the foregoing embodiment, it can be further reduced by 155 words (2480 bits), and in this constitution, too, the pointer RAM for storing the head address of each DCT block is not necessary, and the circuit scale is reduced also in this respect, and its effect is outstanding.

Figure 28:
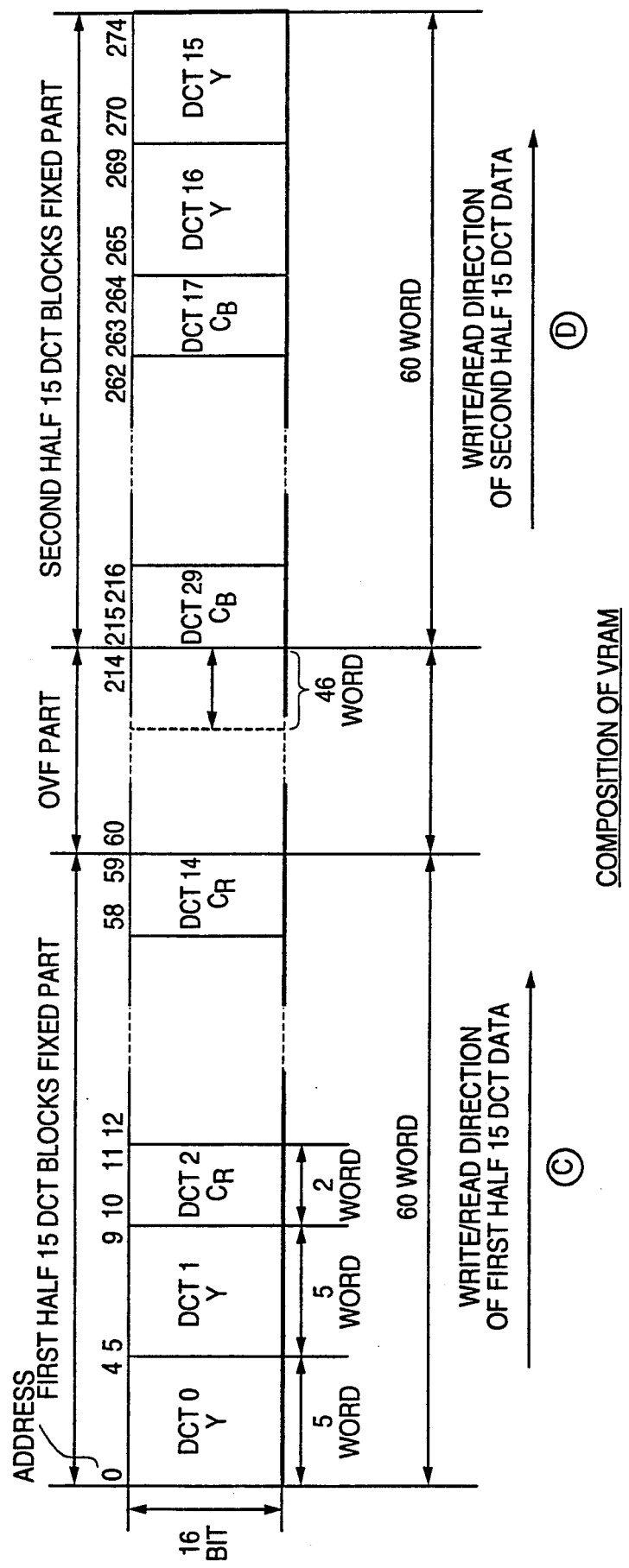
FIG. 28 is a structural diagram showing the constitution of a VRAM in an embodiment of the same apparatus.

FIG. 28 is a structural diagram showing another embodiment of the constitution of the VRAM in this apparatus. In the diagram, what is different from the preceding second embodiment is that the data write/read address sequence is reverse to that of the first half 15 DC blocks, in the fixed part, as well as in the OVF part, of the second half 15 DCT blocks. That is, as shown in FIG. 28, in the fixed part of the second half 15 DCT blocks, address 274 is the beginning of the fixed part of DCT 15, and address 215 is the final address of the fixed part of DCT 29. Therefore, write/read of data in the first half 15 DCT blocks is in the arrow C direction (address increasing direction), and write/read of data in the second half 15 DCT blocks is in the arrow D direction (address decreasing direction), and the OVF part is assigned with 155 words of addresses 60 to 214. In this embodiment, the capacity of RAM is the same as in the VRAM constitution in the second embodiment, but when controlling the address, the data processing of the first half 15 DCT blocks is done by up-counting only, and the data processing of the second half 15 DCT blocks is one by down-counting only, so that the constitution of the address control part is simplier than in the second embodiment.

Figure 29:
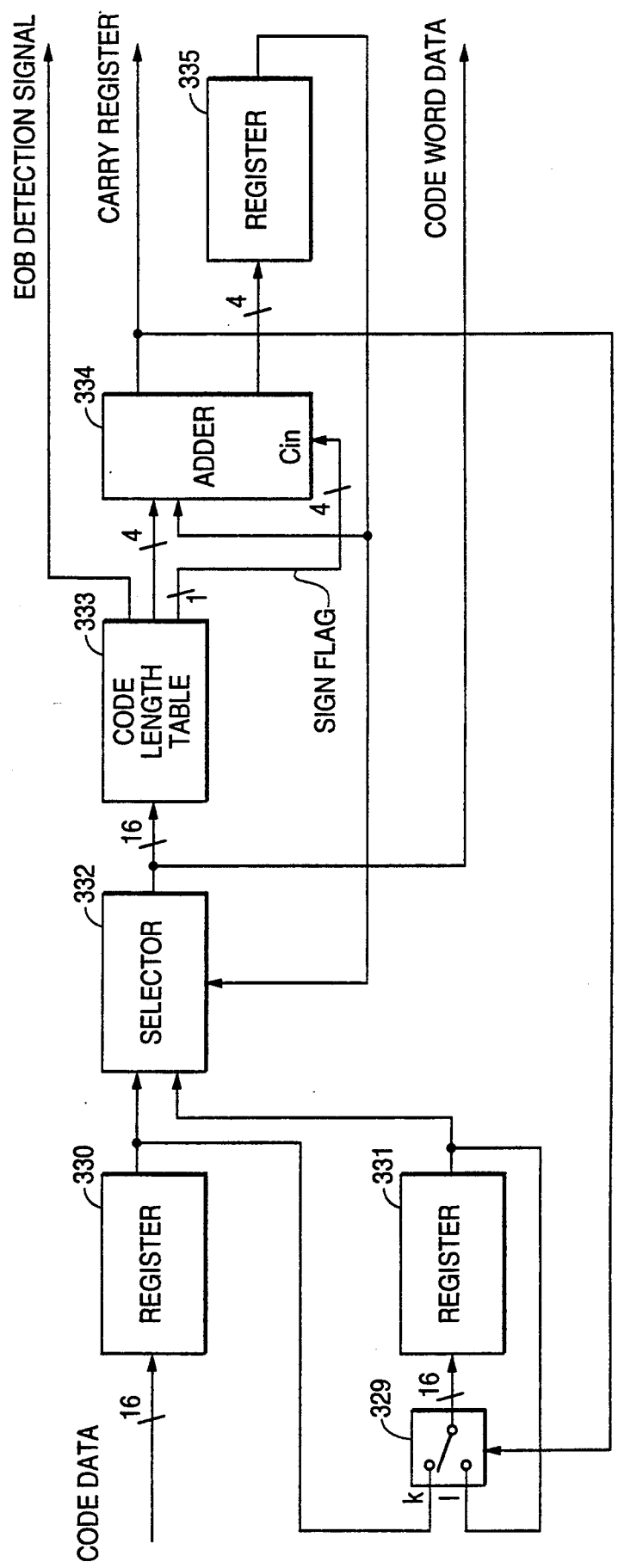
FIG. 29 is a block diagram showing a data control unit of a reproducing apparatus in an embodiment of the invention.
Figure 31:
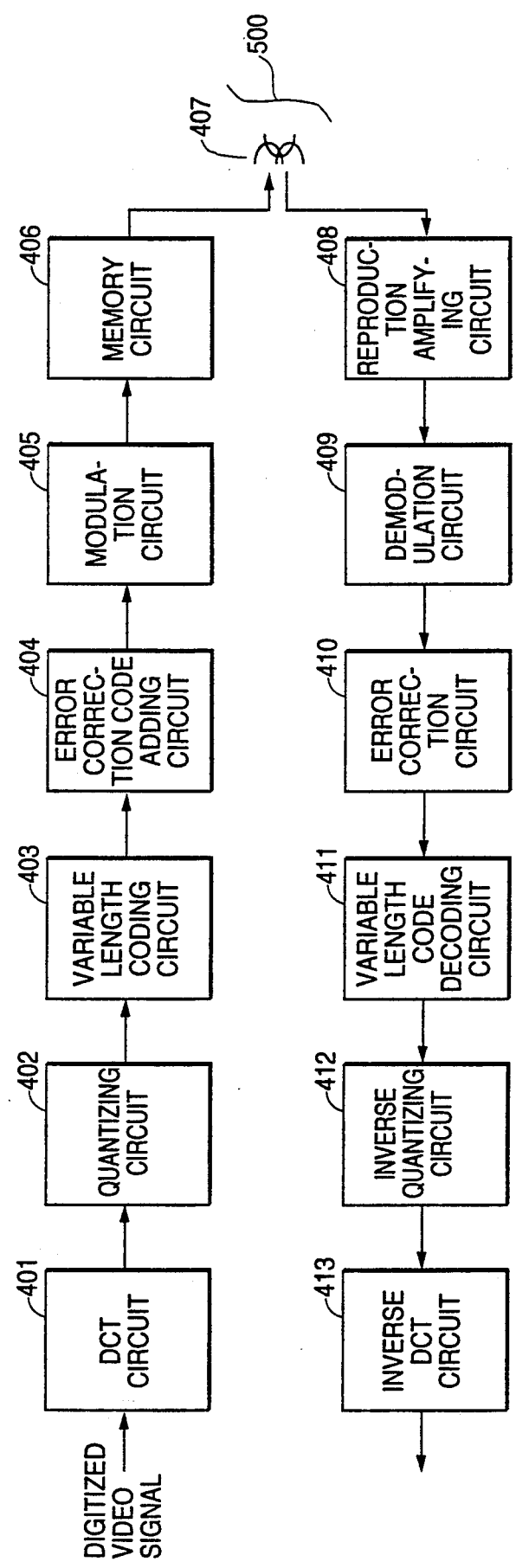
FIG. 31 is a block diagram of a conventional apparatus.

Explained below is the method of cutting out the code data filled in 16-bit unit and stored in the VRAM in the code word data unit in reproduction. FIG. 29 is a block diagram of the data control unit for cutting out in the code word data unit from the VRAM. FIG. 30 is a status diagram showing the mode of shuffling the code data at every time in the data control unit.

In FIG. 29, numeral 320 is a switch for selecting contact 1 when the carry signal of the adder 334 (hereinafter merely called the carry signal) is 0, and contact k when 1, and 330 is a register for latching the code data from the VRAM, in which the address of VRAM is updated at the next time when the carry signal is 1, the same as in the action of address control in recording mentioned above. Numeral 331 is a register for latching the output of the register 330 when the carry signal is 1, or the feedback output of itself when the carry signal is 0, at the next time, by the change-over of the switch 329, and 332 is a selector for selecting the upper 16 bits from the bit position of adding +1 to the output value of the register 335 when the bit positions are numbered as shown in FIG. 30, from the LSB of the register 331 to the MSB of the register 330, by assembling a total of 32 bits of the registers 330, 331 into one output. Numeral 333 is a code length table for putting out the code length and sign flag showing the presence or absence of sign bit from the code word data cut out by the selector 332 and filled up from the LSB side, and, if finding the eob code, setting the eob detection signal to 1. This eob detection signal is a flag, the same as used in recording, telling that the processing of a new DCT block is started from the next time. Numeral 334 is a 4-bit adder for cumulatively adding, together with the register 335, from the code length of the code word data cut out by the selector 332 and the sign flag fed in Cin, and 335 is a register for latching the result of addition of the adder 335 in the next time, and putting out the initial value 15 at the beginning of each DCT block. A case of cutting out the code word data a, b, c, e, f, eob filled up in the VRAM as shown in FIG. 25 (b) is illustrated below.

When the content of address 5 of the VRAM at the beginning of the DCT block is latched in the register 330 at time $t_0$ initially as shown in FIG. 29, since the output of the register 335 is the initial value of 15, the selector 332 selects the bit of the upper side from the bit position 16 of the register 330, and sends it to the variable length code decoding device 143 and code length table 333 in FIG. 20. The action of this selector 332 selecting the bit of the upper side from the bit position of the registers 330, 331 adding +1 to the value shown by the register 335 is the action of cutting out the code word. As shown in FIG. 30, at time $t_0$, the code word a is cut out. At this time, as shown in FIG. 30, the LSB of the output of the selector 332 and the LSB of the code word coincide always with each other. In the variable length code decoding device 143, this code word a is decoded into the zero run value and amplitude value. The code length table 333 sends out the code length 5 of the code word a filled up from the LSB side of the output of the selector 332 and the sign flag 1 to the adder 334. The adder 334 adds this value and the output value of the register 335, and operates 5+15+1=21, and produces the carry signal and 4-bit addition result. The addition result 5 is latched in the register 335 at the next time t1. At time t1, since the carry signal was 1 at time $t_0$, the content of next address 6 of the VRAM is latched in the register 330, and the output of the register 330 is latched in the register 331. At this time, the output of the register 335 indicates 5, and therefore the selector 332 selects the upper 16 bits from the bit position 6 of the registers 330, 331, so that the code word b is cut out as shown in FIG. 30. The code length table 333 produces the code length 10 of the code word b, and the adder 334 calculates 10+5=15. Since this addition result is not carried over, the carry signal is 0. This calculation result 15 is latched in the register 335 at the next time t2.

At time t2, since the carry signal was 0 at time t1, the address of the VRAM is not updated, and the content of the address 6 is latched again in the register 330, and the switch 329 is selected at the contact 1, so that the own feedback value is latched in the register 331. At this time, the output value of the register 335 indicates 5, and the selector 332 selects the upper 16 bits from the bit position 16 of the registers 330, 331, so that the code word c is cut out as shown in FIG. 30. The code length table 333 sends out the code length 7 of the code word c and sign flag 1, and the adder 334 operates 15+17+1=23. At this time, a carry-over occurs in the addition result, and the carry signal becomes 1. This addition result 7 is latched in the register 335 at the next time t3. Thus, in this procedure, this data control unit repeats operation, and cuts out sequentially the code words, a, b, c, d, e, f, eob as showing FIG. 30 until time t6, and sends into the variable length code decoding device 143. By employing this embodiment, in this manner, the code word data may be easily cut out from the code data filled up in 16-bit unit as shown in FIG. 25 (b) in recording. Here, the adder 334 and code length table 333 may be also shared with the code length table 302 and adder 303 of the recording apparatus.

As explaining herein, by filling the code word in 16-bit units, dividing the VRAM into the fixed part and OVF part, inverting writing/reading in and out of the OVF part in the updating address direction between the first half 15 DCT blocks and second half 15 DCT blocks, and cutting out the code word from the code data filled up in 16-bit units, the capacity of VRAM may be notably reduced as compared with the prior art, which may contribute to outstanding reduction of circuit scale and saving of cost.

In the foregoing embodiments, meanwhile, the maximum code length is supposed to be 16 bits, and hence one word of VRAM and processing unit are supposed to be 16 bits, but if the maximum code length is not 16 bits, the invention may be applied, needless to say, only by varying the word length of VRAM and processing unit bit length accordingly.

We claim:

1. An information recording apparatus for forming small blocks each composed of a specified number of pixel components from video pixel data, transforming the pixel components in small blocks for the easy removal of redundancy, quantizing the transformed pixel components and coding in variable length, determining recording blocks of fixed length in every small block, and recording and transmitting variable length code words in every small block coded in variable length in the recording blocks according to a specific format, comprising:

two memories, VRAM and FRAM;

VRAM recording means for writing the transformed pixel components in small blocks into the VRAM without allowing gaps while coding in variable length;

formatting means for writing the variable length code words in every small block written into the VRAM by the VRAM recording means into the FRAM in every variable length code word according to the specific format; and means for transmitting the formatted data written in the FRAM.

2. An information reproducing apparatus for reproducing the data obtained by forming small blocks each composed of a specified number of pixel components from video pixel data, transforming the pixel components in small blocks for the easy removal of redundancy, quantizing the transformed pixel components and coding in variable length, determining recording blocks of fixed length in every small block, and recording and transmitting variable length code words in every small block coded in variable length in the recording blocks according to a specific format, comprising:

two memories, VRAM and FRAM;

deformatting means for writing the transmitted formatted data into the FRAM, and classifying the data written in the FRAM into small blocks in every variable length code word and writing into the VRAM; and variable length decoding means for decoding the variable length code words in every small block written into the VRAM by the deformatting means in variable length and decoding into the transformed pixel components.

3. An information recording/reproducing apparatus for forming small blocks each composed of a specified number of pixel components from video pixel data, transforming the pixel components in small blocks for the easy of removal of redundancy, quantizing the transformed pixel components and coding in variable length, determining recording blocks of fixed length in every small block, and recording and transmitting variable length code words in every small block coded in variable length in the recording blocks according to a specific format or reproducing the transmitted data in the specific format, comprising:

an information recording apparatus comprising: two memories, VRAM and FRAM; VRAM recording means for writing the transformed pixel components in small blocks into the VRAM without allowing gaps while coding in variable length; formatting means for writing the variable length code words in every small block written into the VRAM by the VRAM recording means into the FRAM in every variable length code word according to the specific format; and means for transmitting the formatted data written in the FRAM; and an information reproducing apparatus comprising: two memories, VRAM and FRAM; deformatting means for writing the transmitted formatted data into the FRAM, and classifying the data written in the FRAM into small blocks in every variable length code word and writing into the VRAM; and variable length decoding means for decoding the variable length code words in every small block written into the VRAM by the deformatting means in variable length and decoding into the transformed pixel components;

wherein the VRAM recording means and variable length decoding means, or the formatting means and deformatting means are shared and used separately by changing over the same circuit by a switch.

4. An information recording apparatus of claim 1 or 3, wherein the VRAM recording means comprises:

variable length coding means for coding the input quantized value in variable length;

code length detecting means for detecting the code length simultaneously with variable length coding;

shifting means for shifting the variable length code word obtained by the variable length coding means on the basis of the code length obtained by the code length detecting means;

a register for storing a series of continuous variable length code words of a specific length;

select means for selecting the output of the shifting means and the output of the register so that the variable length code word shifted by the shifting means may be connected without gap behind the variable length code word stored already in the register;

register memory means for storing the continuous series of variable length code words mixed by the select means into the register; and VRAM writing means for writing the output of the register into the VRAM when the series of the variable length code word stored in the register memory means exceeds a specific quantity.

5. An information recording apparatus of claim 1 or 3, wherein the formatting means comprises:

switch means for changing over the output from the VRAM and the output from the FRAM by a switch;

shift means for shifting the output of the VRAM or FRAM selected by the switch means;

a register for storing a series of continuous variable length code words of a specific length;

select means for selecting the output of the shift means and the output of the register so that the data shifted by the shift means may be connected without gap behind the data already stored in the register;

register memory means for storing the data mixed by the select means into the register;

code length detecting means for detecting the code length by using the data from the head bit of the variable length code word at the present time among the data stored by the register memory means; and FRAM writing means for adding the code length obtained by the code length detecting means to the head bit of the variable length code word, determining the head bit of the next variable length code word, and writing the output of the register into the FRAM when the head bit is greater than the specified number of bits.

6. An information recording apparatus of claim 2 or 3, wherein the deformatting means comprises:

switch means for changing over the output from the VRAM and the output from the FRAM by a switch;

shift means for shifting the output of the VRAM or FRAM selected by the switch means;

a register for storing a series of continuous variable length code words of a specific length;

select means for selecting the output of the shift means and the output of the register so that the data shifted by the shift means may be connected without gap behind the data already stored in the register;

register memory means for storing the data mixed by the select means into the register;

code length detecting means for detecting the code length by using the data from the head bit of the variable length code word at the present time among the data stored by the register memory means; and VRAM writing means for adding the code length obtained by the code length detecting means to the head bit of the variable length code word, determining the head bit of the next variable length code word, and writing the output of the register into the VRAM when the head bit is greater than the specified number of bits.

7. An information recording apparatus of claim 2 or 3, wherein the variable length decoding means comprises:

a register for storing a series of continuous variable length code words of a specific length;

select means for selecting the output of the VRAM and the output of the registers so that the data output from the VRAM may be connected without gap behind the data already stored in the register;

register memory means for storing the data mixed by the select means into the register;

variable length decoding means for decoding in variable length by using the data from the head bit of the variable length code word at the present time among the data stored by the register memory means and producing a quantized value;

code length detecting means for detecting the code length by using the data from the head bit of the variable length code word at the same time; and means for adding the code length obtained by the code length detecting means to the head bit of the variable length code word to determine the head bit of the next variable length code word, and entering the new data from the VRAM when the head bit is greater than a specified number of bits into the register by using the selector.

8. An information recording/reproducing apparatus for recording variable length code data in a specific format, comprising small block forming means for collecting sample values of input signals and forming small blocks in every m×n pixels, orthogonal transforming means for orthogonally transforming in every small block, quantizing means for quantizing orthogonal components obtained by the orthogonal transforming means, and variable length coding means for coding the output of the quantizing means into variable length code data, which further comprises:

memory means possessing a store area group of a fixed word length specific to each small block for storing only the variable length code data of small blocks, and store areas common to all small blocks for storing the variable length code data not stored in the store areas of the fixed word length.

9. A recording/reproducing apparatus for recording variable length code data in a specific format, comprising small group forming means for collecting sample values of input signals and forming small blocks in every m×n pixels, group forming means for collecting a specific number of small blocks and dividing into groups A and B, orthogonal transforming means for orthogonally transforming in every small block, quantizing means for quantizing the orthogonal components obtained by the orthogonal transforming means, and variable length coding means for coding the output of the quantizing means into variable length code data, which further comprises:

memory means possessing a store area group of a fixed word length specific to each small block for storing only the variable length code data of small blocks, and store areas common to all small blocks for storing the variable length code data not stored in the store areas of the fixed word length, being composed in such a manner as to store, when storing into the common store areas, the variable length code data of the small block belonging to group A from the head address to the final address of the common store area, and to store the variable length code data of the small block belonging to group B from the final address to the head address.

10. A recording/reproducing apparatus of claim 9, wherein the memory means is composed, in the store area group of a fixed word length specific to each small block so that the store area for the small block belonging to group A is disposed from the head address to the final address of the store area group, while the store area for the small block belonging to group B is disposed from the final address to the head address of the store area group.

11. A recording/reproducing apparatus for coding digital information signals into variable length code data and recording in a specific format, comprising means for detecting the code length of the variable length code data, addition means for cumulatively adding the code length, and selector means for selecting the output value by the output from the addition means, wherein the selector means receive the variable length code data and the output data of one time before of the selector means, and selects the data of a specific word length from the input signal depending on the output of the addition means.

12. A recording/reproducing apparatus for reproducing signals recorded in a specific format by coding digital information signals into variable length code words, comprising a register A for temporarily storing the code data filled up in a unit of a specific word length, a register B capable of selecting whether to temporarily store the value of the register A or to hold the value of one time before, selector means for cutting out the variable length code words from the code data on the basis of the output values of the register A and register B, code length detecting means for detecting the code length of the variable length code word cut out by the selector means, and addition means for cumulatively adding the code length which are outputs of the code length detecting means, and controlling, by the output thereof, the select position of the selector means and the selection action of the register B.

* * * * *